(12) United States Patent
Zhu et al.

(10) Patent No.: US 12,366,761 B2
(45) Date of Patent: Jul. 22, 2025

(54) DISPLAY APPARATUS FOR PROVIDING AN ENLARGED DISPLAY AREA

(71) Applicant: SHENZHEN QIZE TECHNOLOGY PARTNERSHIP (LIMITED PARTNERSHIP), Shenzhen (CN)

(72) Inventors: Yisheng Zhu, Shenzhen (CN); Tapani Kalervo Levola, Shenzhen (CN); Houqiang Jiang, Shenzhen (CN)

(73) Assignee: SHENZHEN QIZE TECHNOLOGY PARTNERSHIP (LIMITED PARTNERSHIP), Shenzhen (CN)

( * ) Notice: Subject to any disclaimer, the term of this patent is extended or adjusted under 35 U.S.C. 154(b) by 527 days.

(21) Appl. No.: 17/879,751

(22) Filed: Aug. 2, 2022

(65) Prior Publication Data

US 2023/0418085 A1  Dec. 28, 2023

(30) Foreign Application Priority Data

Jun. 24, 2022 (CN) .......................... 202210730421.4

(51) Int. Cl.
  *G02B 27/44* (2006.01)
  *B60K 35/00* (2024.01)
  (Continued)

(52) U.S. Cl.
  CPC ......... *G02B 27/44* (2013.01); *G02B 26/0808* (2013.01); *G02B 27/0101* (2013.01);
  (Continued)

(58) Field of Classification Search
  CPC .... G02B 27/01–0189; G02B 2027/0105–0198
  See application file for complete search history.

(56) References Cited

U.S. PATENT DOCUMENTS

2021/0063627 A1* 3/2021 Park ....................... G02B 6/005

FOREIGN PATENT DOCUMENTS

| CN | 113741036 A | 12/2021 |
|---|---|---|
| CN | 114217436 A | 3/2022 |

(Continued)

*Primary Examiner* — Christopher A Lamb, II

(57) ABSTRACT

A display apparatus for displaying a virtual image (VIMG1) includes a rotating expander device (EPE1) to form light beams ($B3_{P0,R}, B3_{P1,R}$) of output light (OUT1) by expanding light beams ($B0_{P0,R}, B0_{P1,R}$) of input light (IN1), the expander device (EPE1) includes: a waveguide plate (SUB1), an in-coupling element (DOE1) to form first guided light (B1a) and second guided light (B1c) by coupling input light (IN1) into the waveguide plate (SUB1), a first out-coupling element (DOE3a) to form output light (OUT1) by coupling the first guided light (B1a) out of the waveguide plate (SUB1), and a second out-coupling element (DOE3c) to form output light (OUT1) by coupling the second guided light (B1c) out of the waveguide plate (SUB1). The in-coupling element (DOE1) has a first input grating vector ($V_{1a}$) and a second input grating vector ($V_{1c}$), and an angle ($\alpha_{1ac}$) between the first and second input grating vectors is between 60° and 120°.

12 Claims, 18 Drawing Sheets

(51) Int. Cl.
*B60K 35/23* (2024.01)
*G02B 26/08* (2006.01)
*G02B 27/01* (2006.01)
*G02B 27/42* (2006.01)

(52) U.S. Cl.
CPC ..... *G02B 27/4222* (2013.01); *G02B 27/4272* (2013.01); *B60K 35/00* (2013.01); *B60K 35/23* (2024.01); *B60Y 2200/11* (2013.01)

(56) References Cited

FOREIGN PATENT DOCUMENTS

| CN | 114415377 A | 4/2022 |
| CN | 114966947 A | 8/2022 |

\* cited by examiner

DISPLAY APPARATUS FOR PROVIDING AN ENLARGED DISPLAY AREA

FIELD OF TECHNOLOGY

The present invention relates to a display apparatus for displaying an image.

BACKGROUND TECHNOLOGY

A known virtual display device comprises an optical engine and a diffractive beam expander. The optical engine forms input light beams, which correspond to a primary image displayed on a miniature display. Each input light beam propagates to a different direction, which corresponds to a different display pixel of the miniature display. The diffractive beam expander forms expanded light beams from the input light beams. The user may observe the displayed virtual image when the expanded light beams impinge on his eye.

The virtual display device has an eye box, which refers to the space where the eye can be positioned to view the displayed virtual image. If the eye is outside the eye box, then the expanded light beams do not impinge on the eye, and the eye cannot see the displayed virtual image.

It is known that the size of eye box can be enlarged by increasing the size of an out-coupling element the diffractive beam expander. However, manufacturing of a large out-coupling element may be difficult and/or expensive.

SUMMARY

An object is to provide a display apparatus. An object is to provide a method for displaying an image. An object is to provide an expander device. An object is to provide a method for expanding a light beam. An object is to provide a vehicle, which comprises the display apparatus.

According to an aspect, there is provided an apparatus according to claim 1.

Further aspects are defined in the other claims.

The scope of protection sought for various embodiments of the invention is set out by the independent claims. The embodiments, if any, described in this specification that do not fall under the scope of the independent claims are to be interpreted as examples useful for understanding various embodiments of the invention.

The display apparatus may comprise an optical engine to form an input image, a diffractive expander device to extend exit pupil of the optical engine, and a motor to rotate the expander device.

The rotation of the expander device may provide a large light-emitting display region, which is equivalent to a large hypothetical out-coupling element. The area of the display region may be substantially greater than the area of the actual out-coupling elements of the expander device.

The rotating expander device may enlarge the imaging area of the optical engine so that the display apparatus may emit output light from the entire region swept by the out-coupling elements. In this way, a large eye box display effect can be achieved through a small-area exit pupil. The display apparatus may provide a large eye box by using small out-coupling elements.

The optical engine may provide input light, which corresponds to the input image. The expander device comprises a waveguide plate, an in-coupling element to form first guided light and second guided light by diffracting the input light into the waveguide plate, a first out-coupling element to form output light by diffracting the first guided light out of the waveguide plate, and a second out-coupling element to form output light by diffracting the second guided light out of the waveguide plate. The user may observe the displayed virtual image when the output light impinges on the eye of the user.

The input light may comprise a plurality of input light beams. The output light may comprise a plurality of output light beams. The grating vectors of the in-coupling element and grating vectors of the diffractive out-coupling elements may be selected such that the directions of the output light beams correspond to the directions of the input light beams. The diffractive elements may e.g. facilitate mass production of the expander devices.

The grating periods of the diffractive elements may be selected such that a first output light beam formed by the first out-coupling element may be parallel with a second output light beam formed by the second out-coupling element, in a situation where said output light beams correspond to the same image point of the displayed image.

The rotating expander device may comprise several out-coupling elements to reduce a visually detectable flickering effect and/or to facilitate displaying multi-color images. For example, the number $N_{OUT}$ of the out-coupling elements may be equal to 4, 5, 6, 7, or 8. The flickering frequency of the displayed image may be equal to $N_{OUT}$ times the rotation speed $f_{RPM}$ of the expander device. Increasing the number $N_{OUT}$ of the out-coupling elements may reduce the visually detectable flickering by increasing the flickering frequency beyond the resolution of the human eye. Alternatively, or in addition, increasing the number $N_{OUT}$ of the out-coupling elements may allow reducing the rotation speed $f_{RPM}$ of the expander device. Reducing the rotation speed $f_{RPM}$ may e.g. improve operating reliability and/or may reduce audible noise generated by the rotating expander device.

When the flickering frequency exceeds the time resolution of the human eye, then the entire display region defined by the rotating expander device may be regarded as a visually uniform display surface.

The in-coupling element may comprise two diffraction gratings or a crossed diffraction grating in order to diffract light in a first direction and also in a second transverse direction. A diffraction grating has a grating period and a grating vector, which corresponds to the grating period. The magnitude of the grating vector is inversely proportional to the grating period. The crossed grating may have two grating periods. The crossed grating may have a first grating vector and a second transverse grating vector, respectively.

The in-coupling element of the expander device may be arranged to form first guided light B1$a$ in a first direction, and to form second guided light B1$c$ in a second direction, which is transverse with respect to the first direction. For example, the in-coupling element may form a first guided light beam in the direction of a first grating vector $V_{1a}$ of the in-coupling element, and the in-coupling element may form a second guided light beam in the direction of a second grating vector $V_{1c}$ of the in-coupling element. The magnitude of the second grating vector $V_{1c}$ may be equal to or different from the magnitude of the first grating vector $V_{1a}$.

In an embodiment, the magnitude of the second grating vector $V_{1c}$ may be equal to the magnitude of the first grating vector $V_{1a}$. In this case the device may comprise several out-coupling elements to reduce the visually detectable flickering effect, and/or to allow reducing the rotation speed.

In an embodiment, the in-coupling element may provide guided light to four directions, i.e. to a first direction, to a second direction, which is transverse with respect to the first direction, to a third direction which is opposite to the first direction, and to a fourth (transverse) direction, which is opposite to the second direction. The expander device may comprise four main out-coupling elements to diffract the guided light out of the waveguide plate. The expander device may comprise four main out-coupling elements so that the grating vector of each main out-coupling element may be anti-parallel with a grating vector of the in-coupling element. The out-coupling elements may be arranged around the in-coupling element.

The capability of an in-coupling grating to diffract input light into the waveguide plate may depend on the direction of an input light beam, on the wavelength of the input light beam, on the grating period of the in-coupling grating, and on the refractive index of the waveguide plate. The capability of the in-coupling grating to diffract input light into the waveguide plate may limit the angular width of the displayed virtual image.

In an embodiment, the in-coupling element may have two different grating periods to optimize operation with multi-color light. A first grating period may allow displaying a first color component of a wide image (e.g. green). A second different grating period may allow displaying a second color component of the wide image (e.g. red). The first grating period may be selected to optimize in-coupling, light-guiding and/or out-coupling at a first wavelength. The second different grating period may be selected to optimize in-coupling, light-guiding and/or out-coupling at a second different wavelength.

The magnitude of the second grating vector $V_{1c}$ may be different from the magnitude of the first grating vector $V_{1a}$. The magnitude of the second transverse grating vector $V_{1c}$ may be different from the magnitude of the first grating vector $V_{1a}$, so as to facilitate displaying multi-color images.

In an embodiment, the optical engine and the display apparatus may be delivered separately, wherein the optical engine may be combined with the display apparatus e.g. by a retailer or by an end user. In an embodiment, the optical engine may be a replaceable part of the display apparatus.

In an embodiment, the display apparatus may be a vehicle-mounted head-up display. The display apparatus may be used as a vehicle-mounted head-up display. The large eye box of the display apparatus may facilitate viewing the displayed virtual image e.g. in a situation where the vehicle is driven on a road and the head of the user moves according to the movements of the vehicle.

In an embodiment, the diffractive elements may be produced by using lithographic techniques. For example, an embossing tool may be produced by e-beam lithography, and the diffraction gratings of the out-coupling elements may be formed by using the embossing tool. Increasing the size of the micro-structured area of the embossing tool may significantly increase production costs of the embossing tool. The rotating expander device may provide an enlarged display area without the need to increase the size of the micro-structured area of the embossing tool.

BRIEF DESCRIPTION OF THE DRAWINGS

In the following examples, several variations will be described in more detail with reference to the appended drawings, in which.

DETAILED DESCRIPTION OF THE EMBODIMENTS

Figure 1A:
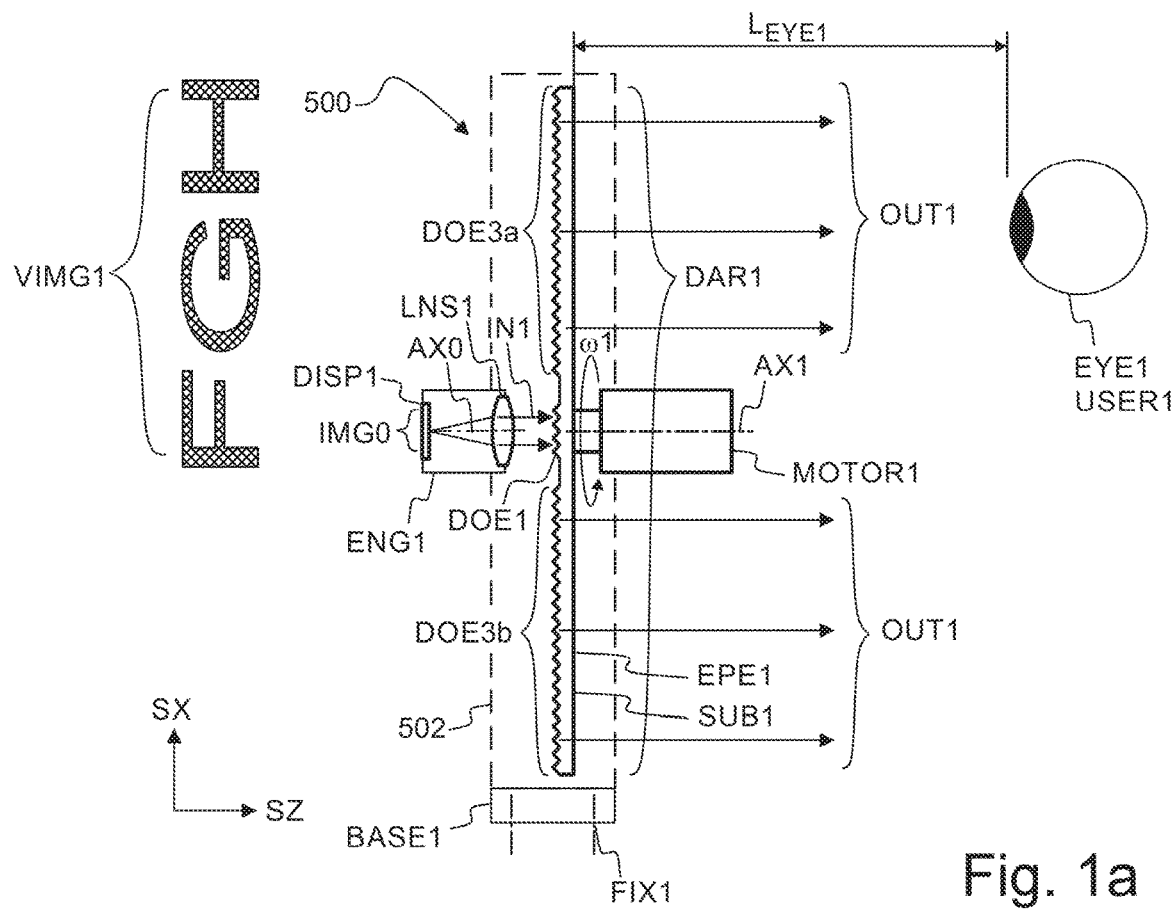
FIG. 1a shows, by way of example, in a side view, a display apparatus.
Figure 1B:
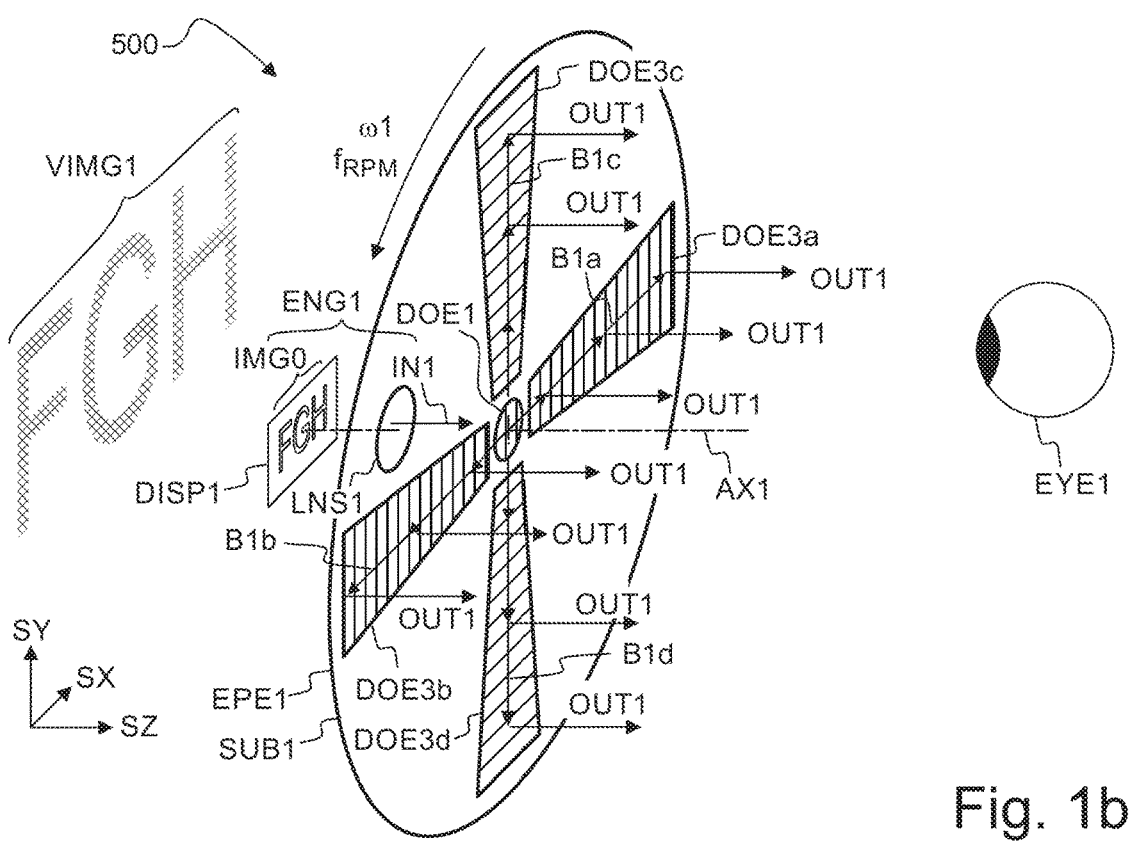
FIG. 1b shows, by way of example, in a three-dimensional view, the display apparatus.

Referring to FIGS. 1a and 1b, the display apparatus 500 may comprise an optical engine ENG1 to form input light IN1, an expander device EPE1 to form output light OUT1 by expanding input light IN1, and a motor MOTOR1 to provide an enlarged display region DAR1 by rotating the expander device EPE1.

A user USER1 of the display apparatus 500 may observe a displayed virtual image VIMG1 when the output light OUT1 impinges on the eye EYE1 of the user.

The input light IN1 may comprise a plurality of light beams propagating in different directions. Each light beam of the input light IN1 may correspond to a different point of the input image IMG0. The input light beams may together constitute input light IN1.

The output light OUT1 may comprise a plurality of light beams propagating in different directions. The output light OUT1 may comprise a plurality of output light beams corresponding to different points of the virtual image VIMG1. The expander device EPE1 may form the output light OUT1 from the input light IN1 such that the directions and the intensities of the light beams of the output light OUT1 correspond to the points of the input image IMG0. The expander device may expand light of the input light beams. The expander device EPE1 may form the output light beams by expanding the input light beams of the input light IN1. In particular, the expander device EPE1 may form the output light beams by diffractively expanding the input light beams. Each output light beam may propagate in the same direction as the corresponding input light beam. Consequently, the displayed virtual image VIMG1 may represent the input image IMG0.

A light beam of the input light IN1 may correspond to a single image point (P0) of a displayed image. The expander device EPE1 may form an output light beam from a light beam of the input light IN1 such that the direction ($k3_{P0,R}$) of the output light beam is parallel with the direction ($k0_{P0,R}$) of the corresponding light beam of the input light IN1. A light beam corresponding to a different image point may propagate in a different direction. Directions and image points are shown e.g. in FIGS. 4a to 4i.

The optical engine ENG1 may form input light IN1, which corresponds to an input image IMG0. The optical engine ENG1 may form input light IN1, which represents an input image IMG0. The input light IN1 may comprise a plurality of input light beams propagating in different directions corresponding to different image points of the input image IMG0. The optical engine ENG1 may comprise a display DISP1 and collimating optics LNS1 to form the input light beams. The optical engine ENG1 may project the input light IN1 to the in-coupling element DOE1. The optical engine ENG1 may also be called e.g. as a projector.

The expander device EPE1 may comprise a waveguide plate SUB1, which in turn may comprise an in-coupling element DOE1, and several out-coupling elements DOE3a, DOE3b, DOE3c, DOE3d. The in-coupling element DOE1 may couple the input light IN1 into the waveguide plate SUB1. The input light IN1 may impinge on the in-coupling element DOE1. The input light IN1 may overlap the in-coupling element DOE1. The axis AX1 of rotation may intersect the in-coupling element DOE1. The in-coupling element DOE1 may be concentric with the axis AX1 of rotation.

Each element DOE1, DOE3a, DOE3b, DOE3c, DOE3d may comprise one or more diffraction gratings. The gratings may be e.g. on the first and/or on the second surface of the waveguide plate SUB1. The elements DOE1, DOE3a, DOE3b, DOE3c, DOE3d may be diffractive elements. The in-coupling element DOE1 may form guided light B1a, B1b by diffracting the input light IN1. The guided light B1a, B1b may propagate as waveguided light in the waveguide plate SUB1.

The out-coupling elements DOE3a, DOE3b may form output light OUT1 by diffracting the guided light B1a, B1b out of the waveguide plate SUB1. The out-coupling elements DOE3a, DOE3b may operate as a first pair of elements. The out-coupling elements DOE3a, DOE3b may be on opposite sides of the in-coupling element DOE1.

Figure 9A:
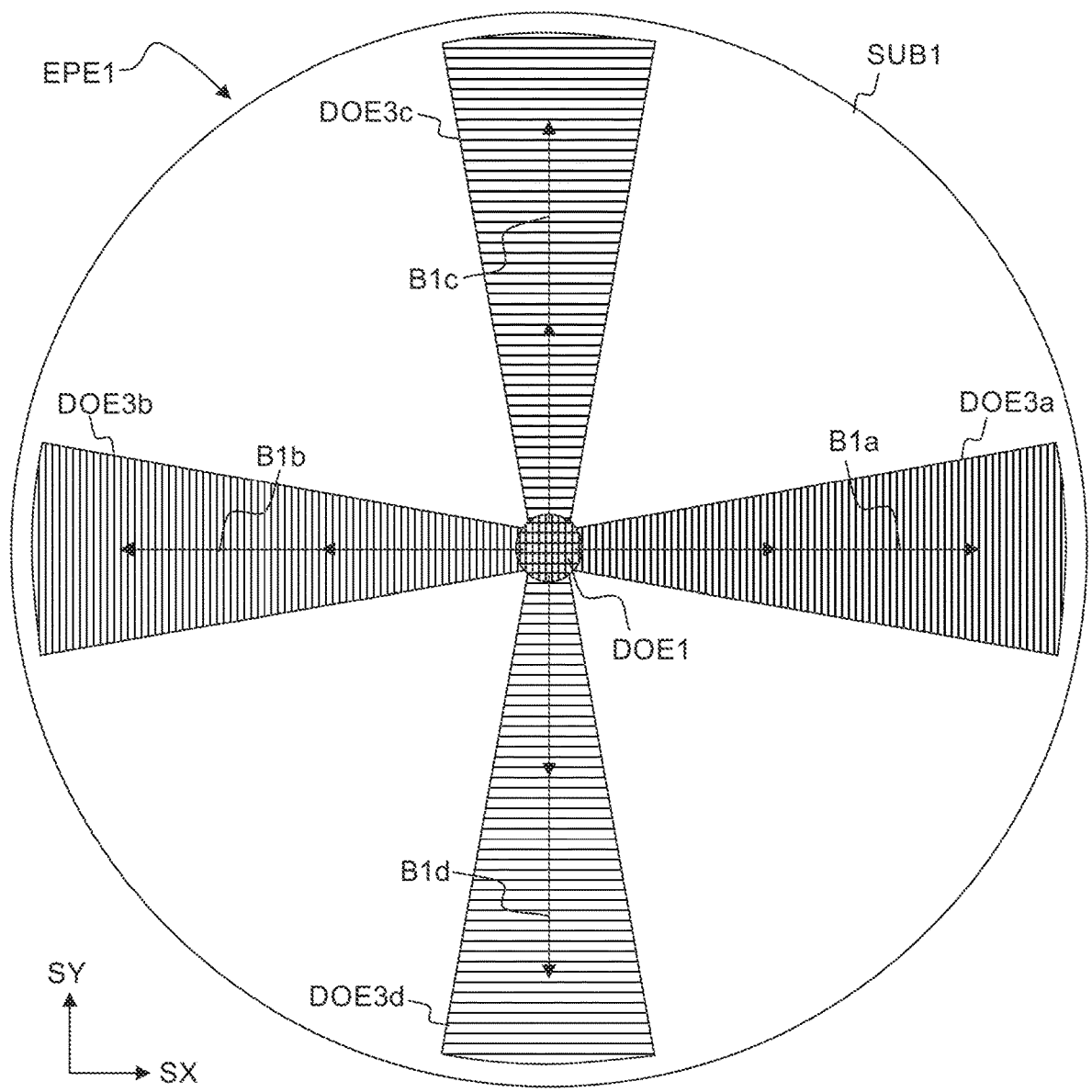
FIG. 9a shows, by way of example, in an axial view, an expander device, which comprises four main out-coupling elements, wherein a first main out-coupling element couples first guided light out of the waveguide plate, and a second main out-coupling element couples second guided light out of the waveguide plate.
Figure 9B:
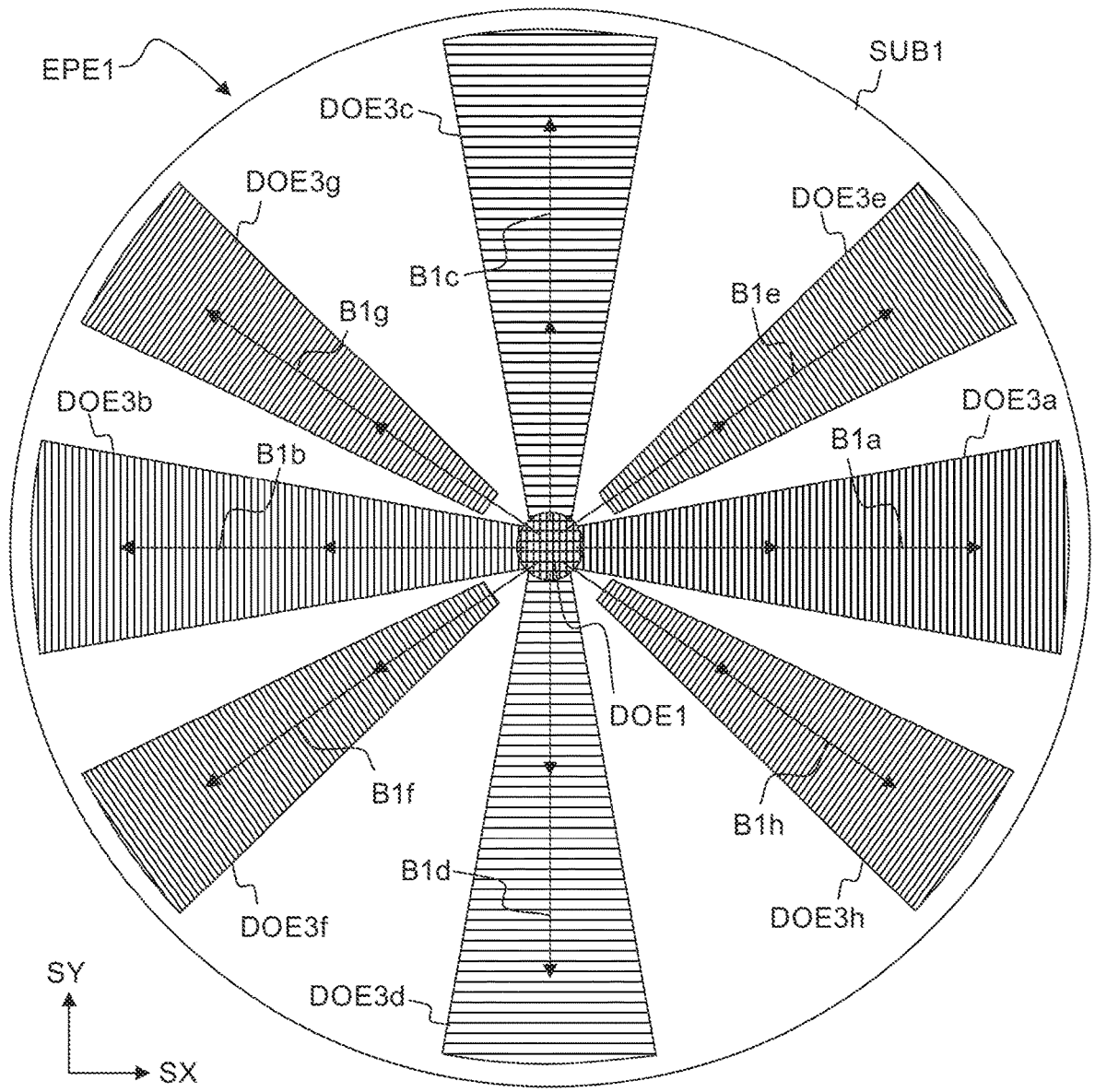
FIG. 9b shows, by way of example, in an axial view, an expander device, which comprises four main out-coupling elements, and four intermediate out-coupling elements, wherein a first main out-coupling element is arranged to couple first guided light out of the waveguide plate, a second main out-coupling element is arranged to couple second guided light out of the waveguide plate, and a first intermediate out-coupling element is arranged to couple first intermediate guided light out of the waveguide plate.
Figure 9C:
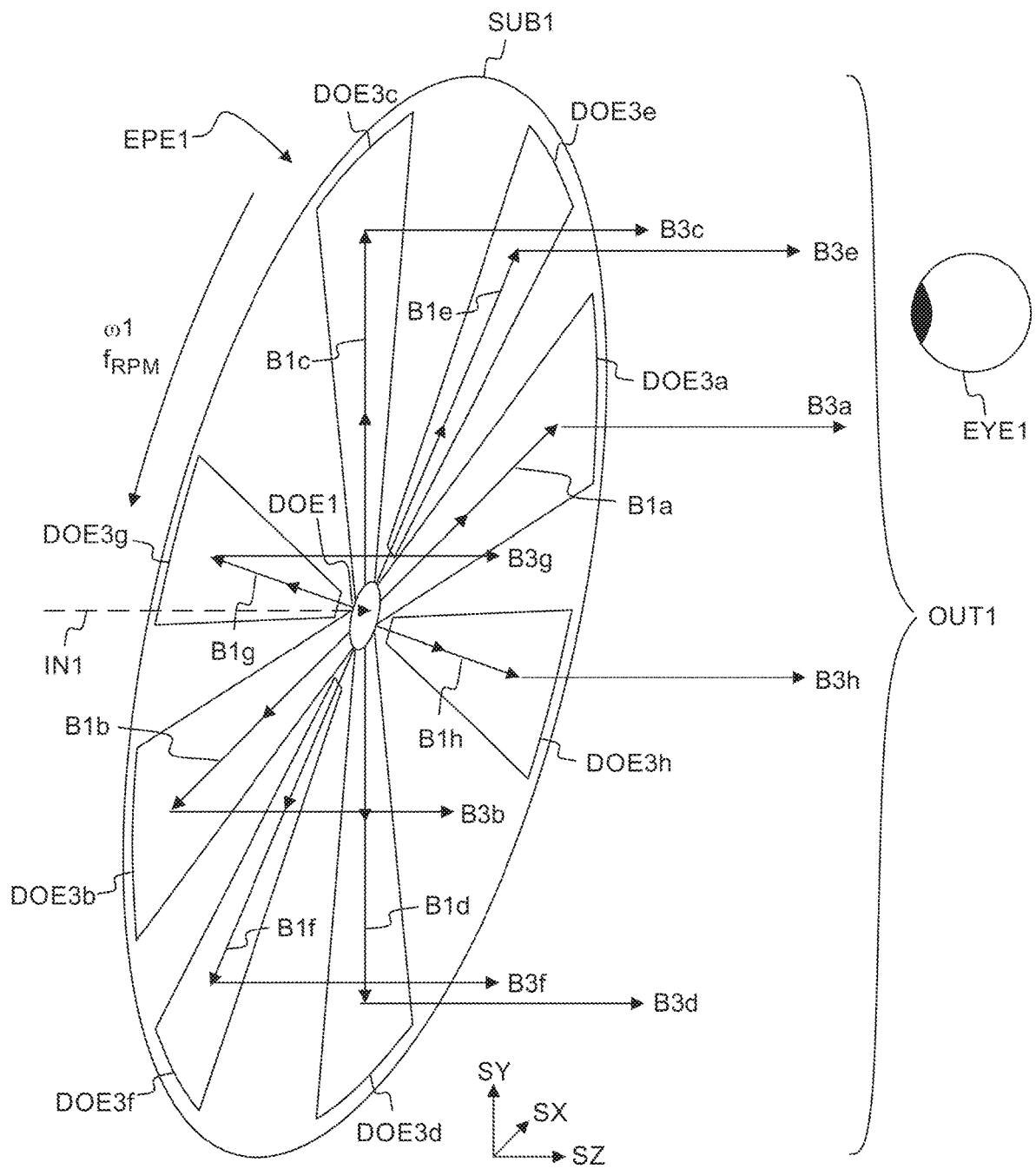
FIG. 9c shows, by way of example, in a three-dimensional view, the expander device of FIG. 9b.

The out-coupling elements DOE3c, DOE3d may form output light OUT1 by diffracting guided light B1c, B1d out of the waveguide plate SUB1 (see FIG. 9c). The out-coupling elements DOE3c, DOE3d may operate as a second pair of elements. The out-coupling elements DOE3c, DOE3d may be on opposite sides of the in-coupling element DOE1.

In an embodiment, the first pair of elements DOE3a, DOE3b may be optimized for displaying a first color component of a displayed image, and the second pair of elements DOE3c, DOE3d may be optimized for displaying a second color component of the displayed image.

The expander device EPE1 may be arranged to expand a viewing pupil of the display apparatus 500, so as to facilitate keeping the eye in a suitable transverse position with respect to the display apparatus 500.

The expander device EPE1 may be arranged to rotate with respect to a stationary base BASE1. The display apparatus 500 may be mounted e.g. to a vehicle 1000 via the base BASE1. The display apparatus 500 may be mounted to a vehicle 1000 e.g. via one or more joints FIX1. The joints may be e.g. adhesive joints and/or screw joints.

The optical engine ENG1 may have a fixed position with respect to the base BASE1. The optical engine ENG1 may be fixedly mounted to the base BASE1. The optical engine ENG1 may be stationary with respect to the base BASE1. The expander device EPE1 may be arranged to move with respect to the stationary base BASE1. The expander device EPE1 may be rotatable with respect to the stationary base BASE1. The expander device EPE1 may be arranged to rotate and/or oscillate with respect to the stationary base BASE1.

The display apparatus 500 may comprise an actuating mechanism MOTOR1 to cause rotary and/or oscillatory motion of the expander device EPE1 with respect to the stationary base BASE1. The actuating mechanism MOTOR1 may be directly or indirectly connected to the base BASE1. The actuating mechanism MOTOR1 may be connected to the base BASE1 e.g. via a protective cover 502 and/or via a frame. The actuating mechanism MOTOR1 may be e.g. a motor. The actuating mechanism MOTOR1 may be e.g. an electric motor or a pneumatic turbine. The motor MOTOR1 may rotate the expander device EPE1 about an axis AX1 of rotation. The expander device EPE1 may rotate at an angular velocity $\omega_1$, which corresponds to a speed of rotation $f_{RPM}$.

The optical engine ENG1 may be mechanically connected to the base BASE1 e.g. via a protective cover 502. The protective cover may be transparent or semi-transparent. For example, a transparent cover 502 may comprise clear glass or plastic. For example, semi-transparent cover 502 may comprise mesh, which has a see-through property. The protective cover 502 may also prevent the user from accidentally touching the rotating expander device EPE1.

The optical engine ENG1 may be mechanically connected to the base BASE1 also via a connecting structure. In an embodiment, the connecting structure may be an open structure. It is not always necessary to protect the rear side of the rotating expander device EPE1.

The symbol $L_{EYE1}$ denotes the distance between the expander device EPE1 and the eye EYE1 of the user. When using the display apparatus 500 as a head-up display of a vehicle 1000, the distance $L_{EYE1}$ may be e.g. in the range of 0.1 m to 1.0 m.

SX, SY and SZ denote orthogonal directions. The waveguide plate SUB1 may be parallel with a plane defined by the directions SX and SY.

The in-coupling element DOE1 may receive input light IN1, and the out-coupling elements may provide output light OUT1. The input light IN1 may comprise a plurality of light beams propagating in different directions. The output light OUT1 may comprise a plurality of expanded light beams (B3) formed from the light beams (B0) of the input light IN1.

The expander device EPE1 forms an output light OUT1 by expanding input light IN1. The width $w_{OUT1}$ of the light beams of the output light OUT1 may be greater than the width $w_{IN1}$ of the light beams of the input light IN1. The expander device EPE1 may expand the input light IN1 at least in the direction of a grating vector ($V_1$) of the in-coupling element DOE1. The expander device EPE1, when the grating vector ($V_1$) is parallel with the horizontal direction (SX), may expand the input light IN1 in the horizontal direction (SX). The expander device EPE1, when the grating vector ($V_1$) is parallel with the vertical direction (SY), may expand the input light IN1 in the vertical direction (SY).

When rotating, the expander device EPE1 may sequentially increase the horizontal cross-sectional dimension $w_{OUT1}$ and the vertical cross-sectional dimension $h_{OUT1}$ of the output light beams (B3) of the output light OUT1. When rotating, the expander device EPE1 may effectively expand the input light IN1 in two dimensions (e.g. in the direction SX and in the direction SY). The expansion process may also be called as exit pupil expansion. The expander device EPE1 may be called as a beam expander device or as an exit pupil expander.

The in-coupling element DOE1 may form guided light B1 by coupling input light IN1 into the waveguide plate SUB1. The in-coupling element DOE1 may form guided light B1a, B1b by coupling input light IN1 into the waveguide plate SUB1. The guided light B1, B1a, B1b may be waveguided within the planar waveguide plate SUB1. The B1, B1a, B1b may be confined to the plate SUB1 by total internal reflection. The term "guided" may mean that the light propagates within the planar waveguide plate SUB1 so that the light is confined to the plate by total internal reflection (TIR). The waveguide plate SUB1 operates as a light guide. The term "guided" may mean the same as the term "waveguided".

Figure 1C:
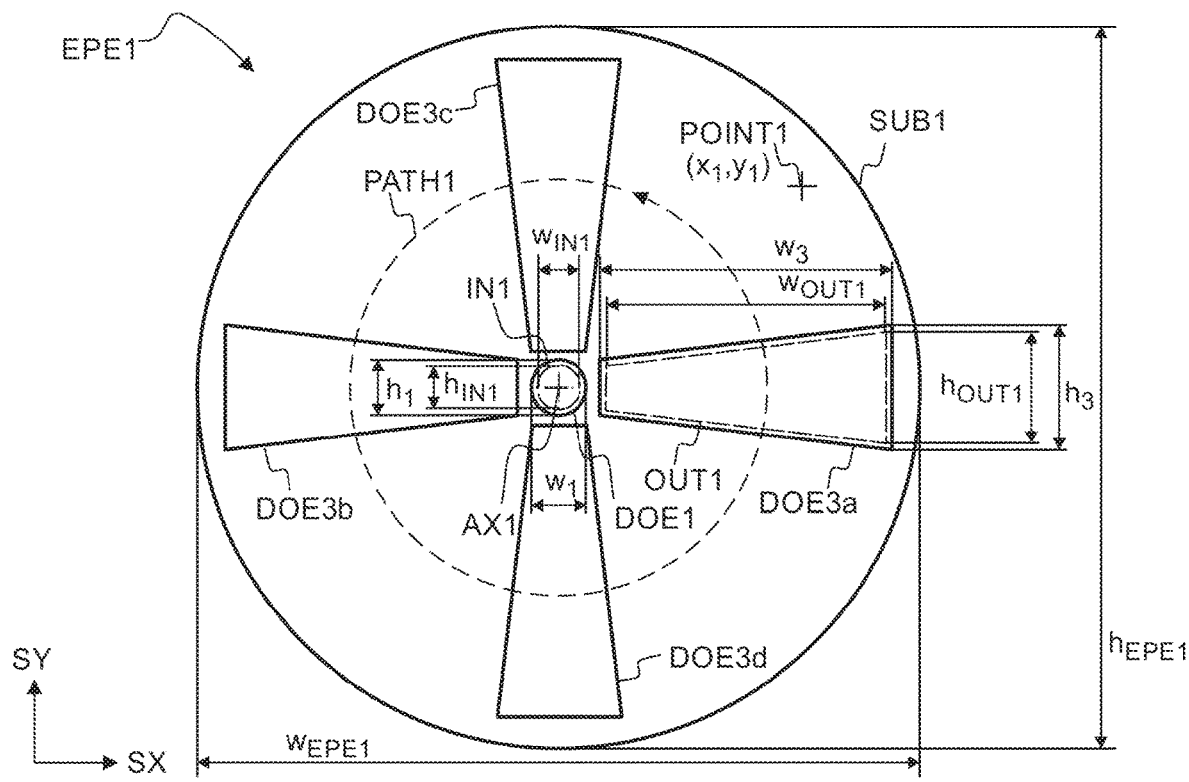
FIG. 1c shows, by way of example, in an axial view, the display apparatus.
Figure 1D:
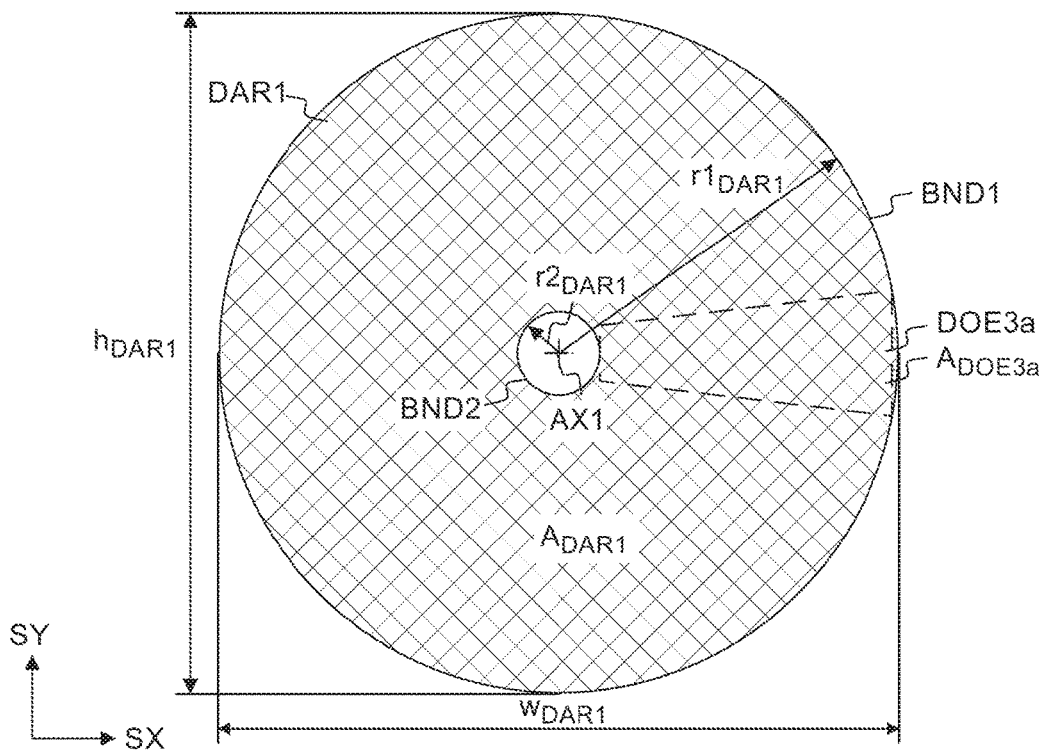
FIG. 1d shows, by way of example, in an axial view, an effective display region formed by rotating out-coupling elements.

Referring to FIGS. 1c and 1d, the out-coupling elements DOE3a, DOE3b, DOE3c, DOE3d may generate a large display region DAR1 by sweeping along a circular path PATH1 around the axis AX1 of rotation. An arbitrary point (e.g. POINT1) of the display region DAR1 may have a fixed position ($x_1,y_1$) with respect to the base BASE1. ($x_1,y_1$) may denote e.g. the position coordinates with respect to the stationary base BASE1. The arbitrary point (POINT1) may emit output light OUT1 in a pulsed manner when the expander device EPE1 rotates so that said point (POINT1) is within the area of an out-coupling element (e.g. DOE3a). The emission of output light OUT1 from said point (POINT1) may be periodically stopped when the out-coupling element (e.g. DOE3a) moves so that the point (POINT1) is outside the area of the out-coupling elements (DOE3a, DOE3b, DOE3c, DOE3d). The speed of rotation ($f_{RPM}$) may be selected to be high enough so as to reduce or avoid visually detectable flickering of said point (POINT1) of the display region (DAR1).

Each point of the display region DAR1 may sequentially emit output light OUT1 in a pulsed manner when the out-coupling elements DOE3a, DOE3b, DOE3c, DOE3d sweep over said point. The out-coupling elements DOE3a, DOE3b, DOE3c, DOE3d may form an annular display region DAR1 by sweeping along the circular path PATH1. The whole display region DAR1 may emit output light OUT1 in a pulsed manner.

The symbol $w_{EPE1}$ denotes the width of the expander device EPE1 in the horizontal direction SX (in a situation where rotation of the expander device EPE1 is stopped and the first element DOE3a aligned with the horizontal direction SX). $h_{EPE1}$ denotes the height of the expander device EPE1 in the vertical direction SY. The expander device EPE1 may also be substantially circular, and the diameter of the expander device EPE1 may be equal to the width $w_{EPE1}$.

$w_{DAR1}$ denotes the width of the display region DAR1. $h_{DAR1}$ denotes the height of the display region DAR1. $A_{DAR1}$ denotes the effective surface area of the display region DAR1. $A_{DOE3}$ denotes the surface area of an out-coupling element DOE3 (or DOE3a). The effective surface area $A_{DAR1}$ of the display region DAR1 may be greater than the surface area $A_{DOE3}$ of the out-coupling element DOE3 (or DOE3a).

In an embodiment, the expander device EPE1 and/or the motor MOTOR1 may block a central region of the display region DAR1, so that the display region DAR1 has a dark center. The display region DAR1 may be e.g. an annular region, which is defined by an inner boundary BND2 and by an outer boundary BND1. The inner boundary BND2 may have a radius $r2_{DAR1}$. The outer boundary BND1 may have a radius r1$_{DAR1}$. The boundaries BND1, BND2 may be concentric with the axis AX1 of rotation.

Figure 8A:
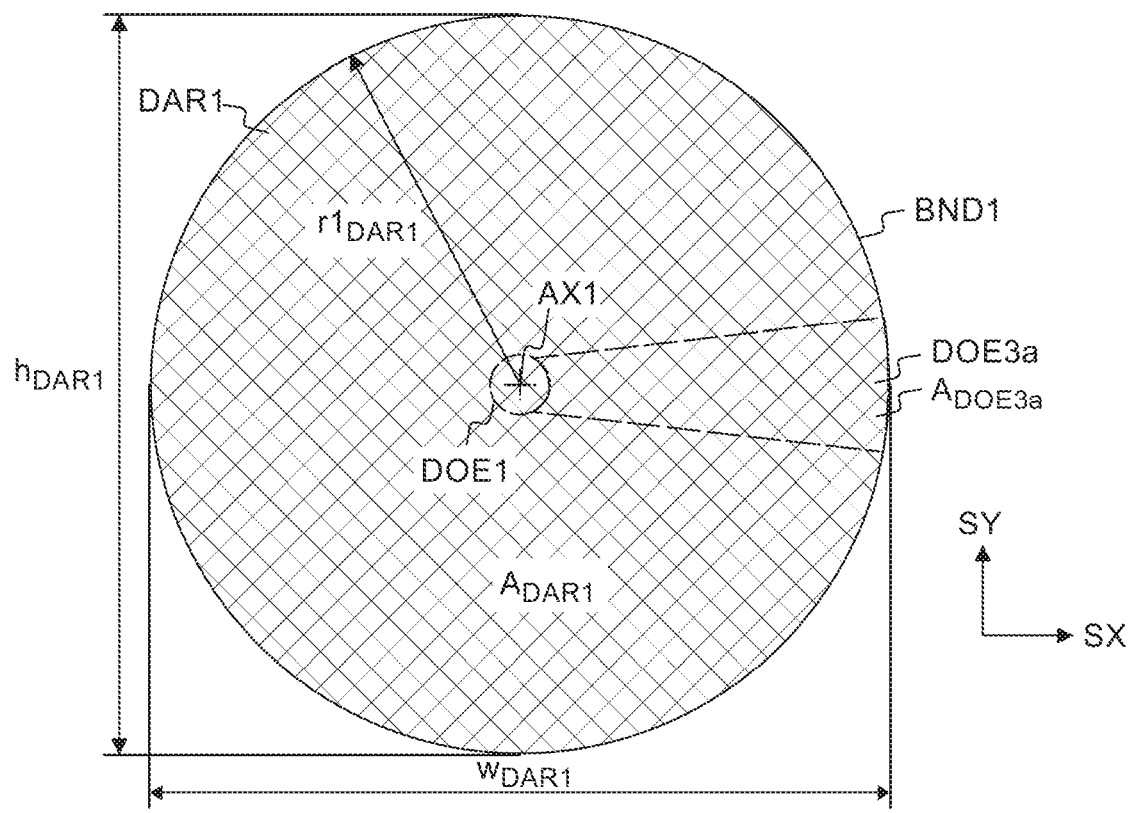
FIG. 8a shows, by way of example, in an axial view, an effective display region formed in a situation where also the in-coupling element provides output light in addition to the out-coupling elements.

In an embodiment, also the center region of the expander device EPE1 may be arranged to provide output light OUT1 so that the circular display region DAR1 does not have a dark center (FIG. 8a).

The radius r1$_{DAR1}$ of the outer boundary BND1 may be e.g. in the range of 4 cm to 25 cm. The width w$_{EPE1}$ of the expander device EPE1 may be e.g. in the range of 8 cm to 50 cm. The surface area A$_{DAR1}$ of the display region DAR1 may be e.g. in the range of 100 cm$^2$ to 2000 cm$^2$.

w$_1$ denotes the width of the in-coupling element DOE1. h$_1$ denotes the height of the in-coupling element DOE1. w$_{IN1}$ denotes the cross-sectional width of the input light beams (IN1). h$_{IN1}$ denotes the cross-sectional height of the input light beams (IN1). w$_3$ denotes the width of the out-coupling element DOE3a. h$_3$ denotes the height of the out-coupling element DOE3a. w$_{OUT1}$ denotes the cross-sectional width of the output light beams (OUT1). h$_{OUT1}$ denotes the cross-sectional height of the output light beams (OUT1). In an embodiment, the cross-sectional dimensions of the output light OUT1 may be defined by the dimensions of the out-coupling element DOE3a. The width W$_{OUT1}$ may be substantially equal to the width w$_3$ and/or the height h$_{OUT1}$ may be substantially equal to the height h$_3$.

The expander device EPE1 may be rotatable relative to the base BASE1. The optical axis AX0 of the optical engine ENG1 may coincide with the axis AX1 of rotation of the expander device EPE1. The optical axis AX0 may be coaxial with the axis AX1 of rotation. The in-coupling element DOE1 may be concentric with the axis AX1 of rotation.

The actuating mechanism MOTOR1 may be arranged to rotate the waveguide plate SUB1 at a rotation speed f$_{RPM}$, which is e.g. in the range of 5 to 200 revolutions per second.

For example, the motor MOTOR1 may be arranged to rotate the expander device EPE1 so that the rotation speed f$_{RPM}$ of the expander device EPE1 is greater than or equal to 30 revolutions per second. Consequently, it may be difficult to visually detect flickering of the displayed image VIMG1.

For example, the motor MOTOR1 may be arranged to rotate the expander device EPE1 so that the rotation speed f$_{RPM}$ of the expander device EPE1 is greater than or equal to 60 revolutions per second. Consequently, it may be more difficult to visually detect flickering of the displayed image VIMG1.

In an embodiment, the expander device EPE1 may be rotatably supported by the one or more bearings of the motor MOTOR1.

Figure 8B:
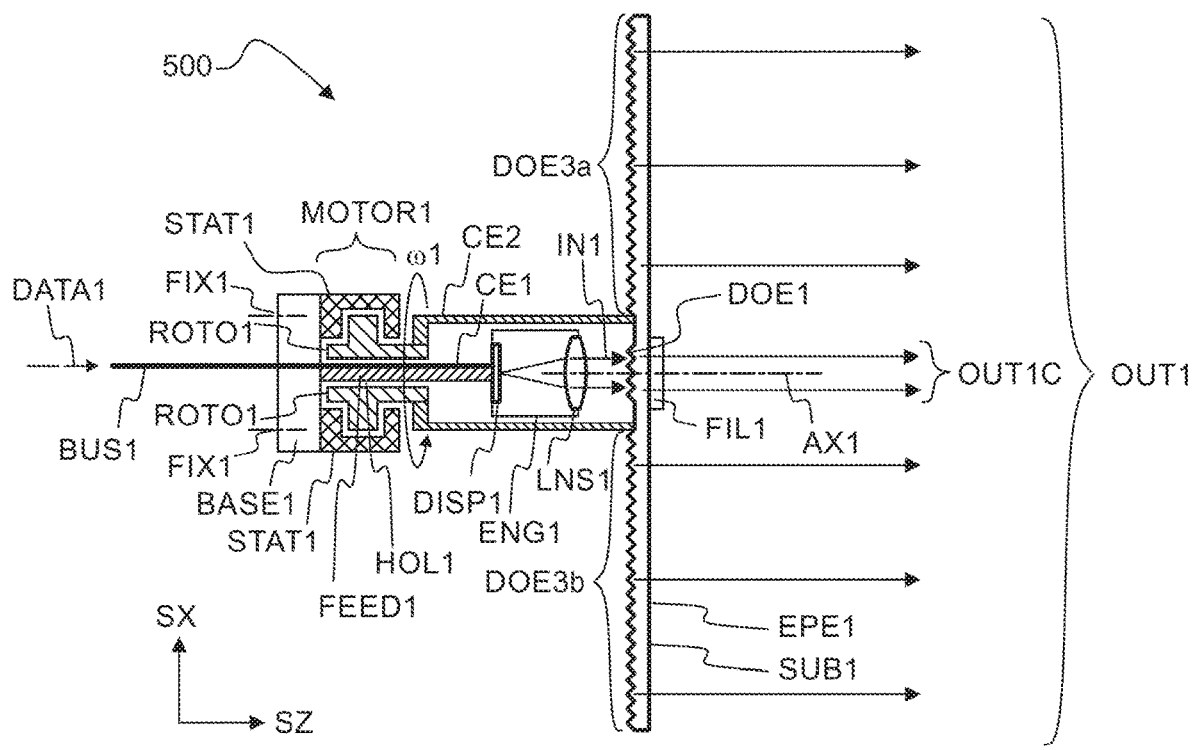
FIG. 8b shows, by way of example, in a side view, the display apparatus, wherein the motor and the optical engine are on the same side of the expander device.
Figure 8C:
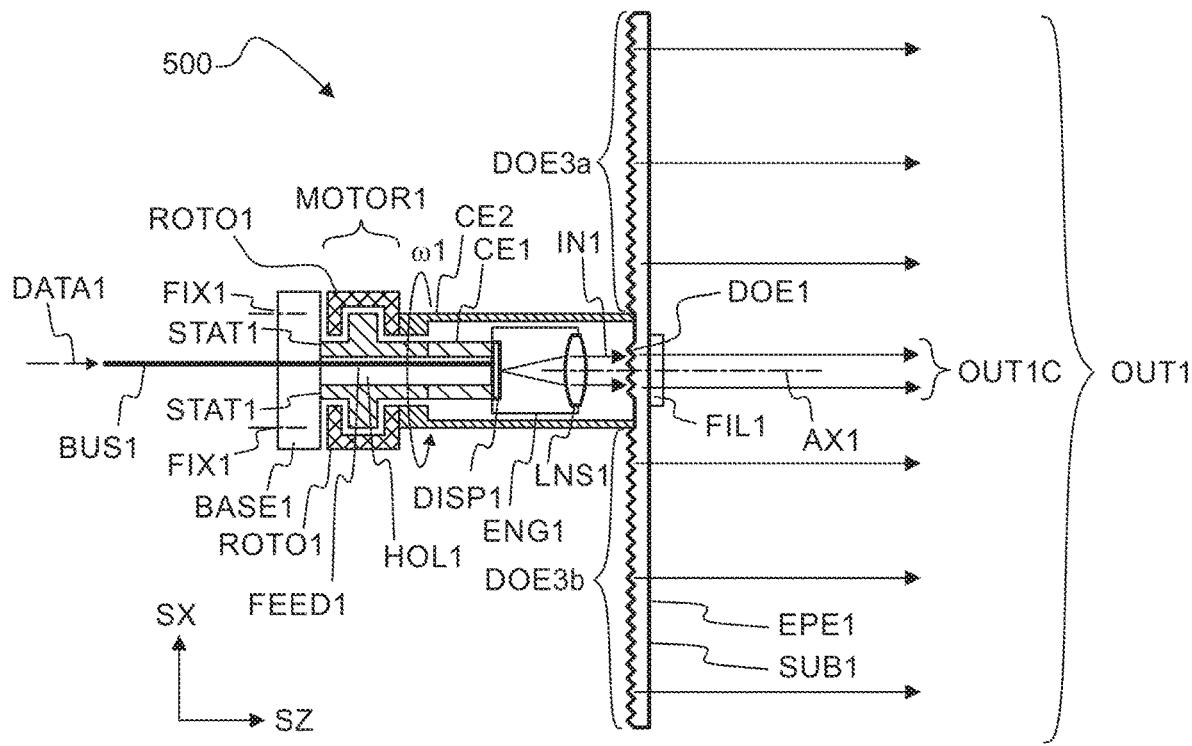
FIG. 8c shows, by way of example, in a side view, the display apparatus, wherein the motor and the optical engine are on the same side of the expander device.

The motor MOTOR1 and the optical engine ENG1 may be on different sides of the expander device EPE1 (FIG. 1a) or on the same side of the expander device EPE1 (FIGS. 8b, 8c). For example, the motor MOTOR1 may have a central opening (HOL1), so as to allow positioning the motor MOTOR1 and the optical engine ENG1 on the same side of the expander device EPE1.

In an embodiment, the expander device EPE1 may operate as a rotating part of the MOTOR1. For example, the expander device EPE1 may comprise magnets or coils to cause a rotating force. The expander device EPE1 may also be rotatably supported by a bearing located at the rim or by a needle bearing located at the axis of rotation AX1.

Figure 2:
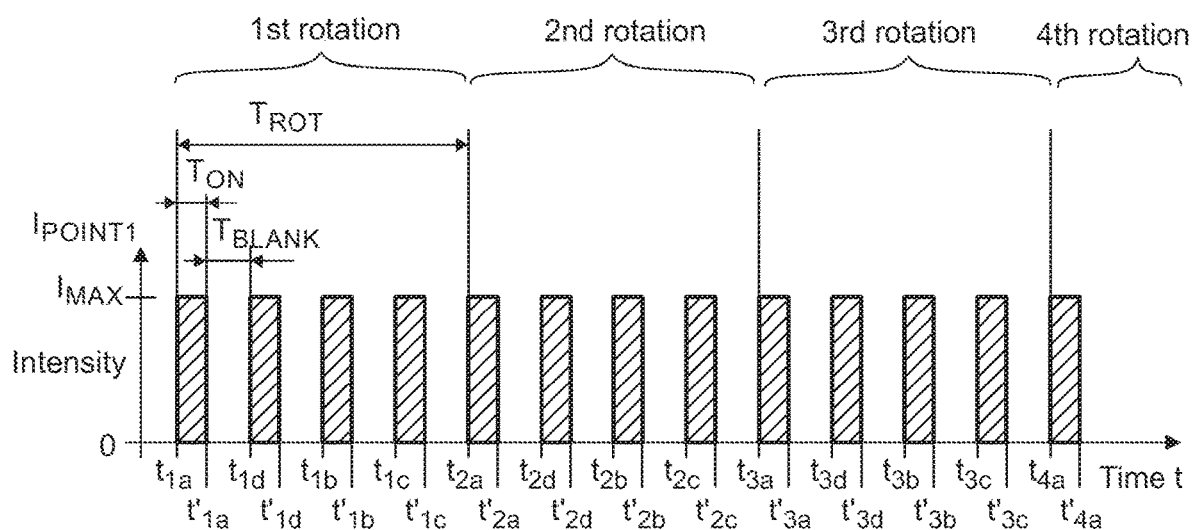
FIG. 2 shows, by way of example, a timing diagram for light emission from a predetermined point of the display region.

FIG. 2 shows, by way of example, a timing diagram for the local intensity I$_{POINT1}$ of an arbitrary stationary point (e.g. POINT1) of the display region DAR1, when displaying a virtual image VIMG1. The point POINT1 appears to emit light to the eye EYE1 in a pulsed manner when the expander device EPE1 rotates. In this example, the expander device EPE1 comprises four out-coupling elements DOE3a, DOE3b, DOE3c, DOE3d. The intensity of the point POINT1 reaches a maximum value I$_{MAX}$ when the point POINT1 overlaps an out-coupling element DOE3a, DOE3b, DOE3c, or DOE3d. The intensity of the point POINT1 is zero when the point POINT1 does not overlap any of the out-coupling elements. T$_{ROT}$ denotes a time period for one full rotation of the expander device EPE1. The time period T$_{ROT}$ is equal to 1/f$_{RPM}$. T$_{ON}$ denotes a time period during which the point POINT1 is within the area of a moving out-coupling element. The symbol T$_{ON}$ also denotes the duration of a light pulse emitted from the point POINT1 when an out-coupling element sweeps over said point POINT1. T$_{BLANK}$ denotes a time period during which the point POINT1 is outside the area of the out-coupling elements. The point POINT1 is within the area of the out-coupling element DOE3a between times t$_{1a}$,t'$_{1a}$, between times t$_{2a}$,t'$_{2a}$, between times t$_{3a}$,t'$_{3a}$, and between times t$_{4a}$,t'$_{4a}$. The point POINT1 is within the area of the out-coupling element DOE3b between times t$_{1b}$,t'$_{1b}$, between times t$_{2b}$,t'$_{2b}$, and between times t$_{3b}$,t'$_{3b}$. The point POINT1 is within the area of the out-coupling element DOE3c between times t$_{1c}$,t'$_{1c}$, between times t$_{2c}$,t'$_{2c}$, and between times t$_{3c}$,t'$_{3c}$. The point POINT1 is within the area of the out-coupling element DOE3d between times t$_{1d}$,t'$_{1d}$, between times t$_{2d}$,t'$_{2d}$, and between times t$_{3d}$,t'$_{3d}$.

The expander device EPE1 may rotate e.g. in the direction shown in FIG. 1, wherein said stationary point POINT1 of the display area DAR1 may overlap the out-coupling elements e.g. in the following order: DOE3a, DOE3d, DOE3b, DOE3c, DOE3a, DOE3d, DOE3b, DOE3c, . . . .

The optical engine ENG1 may be arranged to simultaneously project red light, green light, and blue light, so as to display a multi-color image VIMG1.

The optical engine ENG1 may be arranged to project only one color (e.g. red, green or blue). The expander device may be arranged to display a single-color image VIMG1.

Figure 3A:
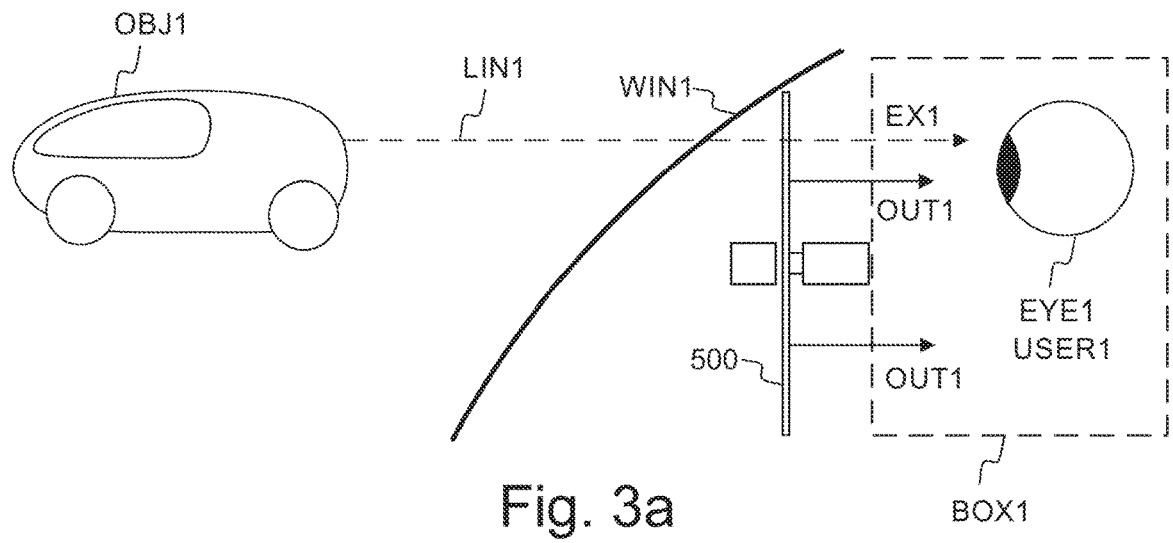
FIG. 3a shows, by way of example, in a side view, observing an external object through a window of a vehicle.
Figure 3B:
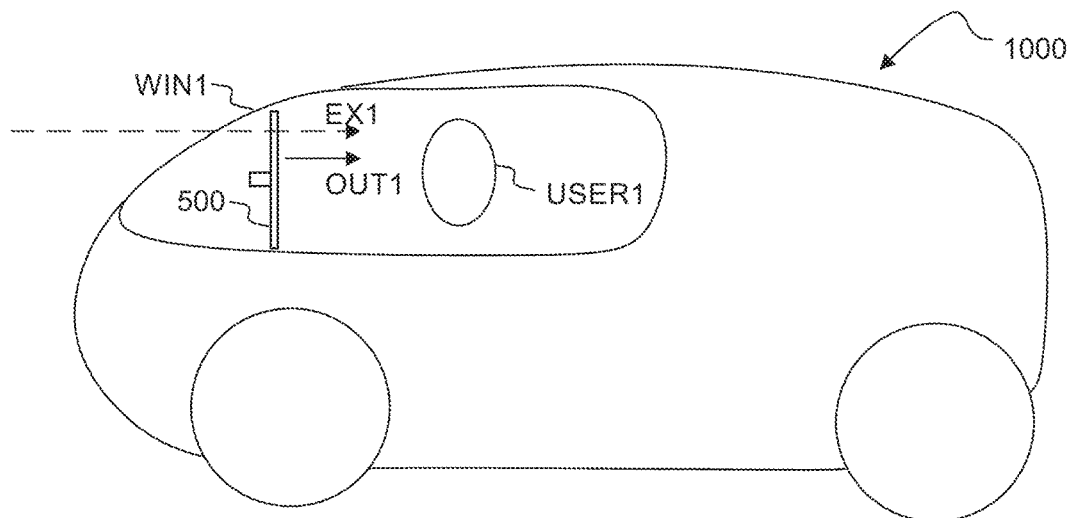
FIG. 3b shows, by way of example, in a side view, receiving external light from the external object through the window of the vehicle.
Figure 3C:
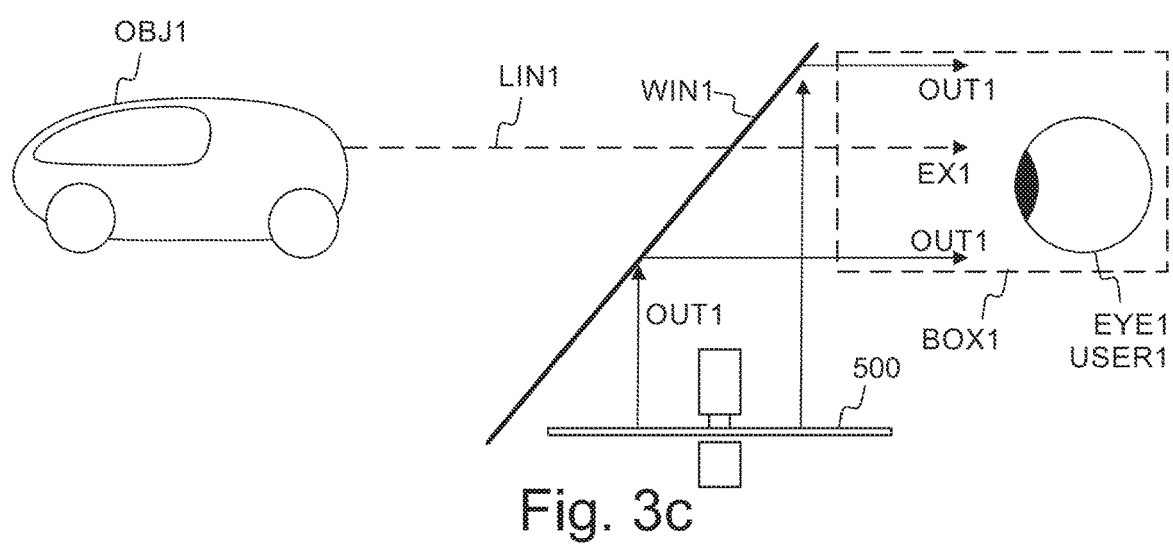
FIG. 3c shows, by way of example, in a side view, observing an external object through a window of a vehicle, wherein the window is also arranged to reflect output light towards the eye of a user.

Referring to FIG. 3a to 3c, the display apparatus 500 may be a vehicle-mounted head-up display. A vehicle 1000 may comprise the display apparatus 500. The vehicle may be e.g. an electric car propelled by an electric motor. The vehicle may be e.g. a car propelled by an internal combustion engine. The vehicle may be e.g. a motorcycle. The vehicle may be e.g. a tram. The vehicle may be e.g. a train.

When driving a vehicle, a driver USER1 may need to observe information related to the driving. The display apparatus 500 of the vehicle may be arranged to display information about the speed of the vehicle, status of a battery, status of a motor of the vehicle, and/or navigation instructions, for example. The user USER1 of the display apparatus 500 may be the driver or a passenger of the vehicle. The user USER1 may see real objects OBJ1 and/or environment through the display region DAR1, in addition to the displayed virtual images VIMG1. When using the display apparatus 500, the driver USER1 does not need to look down at the dashboard in order to observe the displayed information. When using the display apparatus 500, the driver USER1 may continuously observe the environment through the windscreen of the vehicle, without a need to look down. Avoiding the need to look down may improve driving safety. The displayed virtual image VIMG1 may represent the information, which is related to the driving. The virtual image VIMG1 formed by the display apparatus 500 may fall in front of the driver's line of sight LIN1, so that driver USER1 can observe displayed information and external objects at the same time. The driver's line of sight LIN1 may intersect the effective display area DAR1 of the display apparatus 500.

Rotation of the expander device EPE1 may provide a larger display region DAR1 by using smaller out-coupling elements. This may provide a large eye box BOX1 for the user USER1. The user may observe the displayed virtual image VIMG1 as long as the eye EYE1 of the user remains within the eye BOX1 of the display apparatus 500. The rotating expander device EPE1 may provide a uniform spatial intensity distribution for the output light OUT1. The rotating expander device EPE1 may provide a high image quality. The smaller out-coupling elements may be easier and/or cheaper to produce than large out-coupling elements.

The large display region DAR1 may also facilitate displaying a virtual image VIMG1, which has a large angular width $\Delta\varphi$ and/or a large angular height $\Delta\theta$. Thanks to the large display region, the user may see the whole virtual image VIMG1, or at least a large part of the virtual image VIMG1 also when the distance between the eye EYE1 and the expander device EPE1 is large. The virtual image VIMG1 may cover a large field of view. The virtual image VIMG1 may comprise e.g. vehicle information and/or navigation information.

The display apparatus 500 may be mounted to the vehicle 1000 via the base BASE1. For example, the base BASE1 may be mounted to the window WIN1, to a dashboard, or to a ceiling of a vehicle 1000.

The eye EYE1 of the user USER1 may receive external light EX1 from an external object OBJ1. The user USER1 may observe the external object OBJ1 when the external light EX1 impinges on the eye EYE1. The external light EX1 may propagate through the window WIN1 and through the display area DAR1 of the apparatus 500 to the eye EYE1 of the user USER1. The user USER1 may simultaneously observe the external object OBJ1 and the displayed virtual image VIMG1.

Referring to FIG. 3c, the window WIN1 may be arranged to operate as a part of the display apparatus 500. The window WIN1 may be e.g. the windscreen of the vehicle 1000. The window WIN1 may reflect the output light OUT1 towards the user EYE1 so that the user may view the displayed virtual image VIMG1, wherein the user EYE1 may simultaneously observe the environment of the vehicle 1000 through the window WIN1. For example, the line of sight LIN1 from the external object OBJ1 to the eye EYE1 may intersect the display area DAR1. For example, the user may observe an external object OBJ1 through the window WIN1 so that the displayed virtual image VIMG1 may visually overlap the external object OBJ1. The driver may be visually immersed in the environment of the vehicle while viewing the displayed virtual image so that the driver does not need to look down.

The window WIN1 may be a planar (flat) transparent window or a curved transparent window. The planar window may reflect the output light OUT1 without deforming the displayed virtual image VIMG1.

A curved window may deform the displayed virtual image VIMG1. The display apparatus 500 may be arranged to at least partly compensate deformation of the virtual image VIMG1.

The window WIN1 may simultaneously transmit external light EX1 and reflect output light OUT1 to the eye EYE1 of the user USER1. The window WIN1 may operate as a semi-transparent reflector, which may simultaneously transmit external light EX1 and reflect output light OUT1. The external light EX1 may propagate through the window WIN1 to the eye EYE1.

In an embodiment, the window WIN1 may be coated with a semi-transparent reflective coating, e.g. in order to increase the intensity of the reflected output light. The coating may be e.g. a dielectric or metallic coating.

In an embodiment, the semi-transparent reflective window WIN1 may also operate based on Fresnel reflection caused by the difference between the refractive index of the window and the refractive index of air. The semi-transparent reflective window WIN1 does not need to comprise a reflective coating.

Referring to FIG. 4a to 4e, the expander device EPE1 may form output light OUT1 by expanding input light IN1 formed by the optical engine ENG1.

The optical engine ENG1 may comprise a display DISP1 and collimating optics LNS1. The display DISP1 may be arranged to display an input image IMG0. The display DISP1 may also be called e.g. as a micro display. The display DISP1 may also be called e.g. as a spatial intensity modulator. The input image IMG0 may also be called e.g. as a primary image.

The input image IMG0 may comprise a center point P0 and four corner points P1, P2, P3, P4. P1 may denote an upper left corner point. P2 may denote an upper right corner point. P3 may denote a lower left corner point. P4 may denote a lower right corner point. The input image IMG0 may comprise e.g. the graphical characters "F", "G", and "H". The input image IMG0 may represent displayed information.

The input image IMG0 may be e.g. a single-color image. A single-color image IMG0 may be formed e.g. by modulating laser light or by modulating light obtained from one or more light emitting diodes.

The input image IMG0 may also be a multi-color image. The input image IMG0 may be e.g. an RGB image, which may comprise a red partial image, a green partial image, and a blue partial image. Each image point may provide e.g. red light, green light and/or blue light.

The optical engine ENG1 may provide input light IN1, which may comprise a plurality of substantially collimated light beams (B0). For example, each red light beam may propagate in a different direction and may correspond to a different point of the input image IMG0. Each light beam may have a color. For example, the subscript "R" may refer to the red color. For example, a red light beam $B0_{P1,R}$ may correspond to an image point P1, and may propagate in the direction of a wave vector $k0_{P1,R}$. The red light beam corresponding to the image point P1 may propagate in the direction specified by the wave vector $k0_{P1,R}$.

A red light beam $B0_{P2,R}$ may correspond to an image point P2, and may propagate in the direction of a wave vector $k0_{P2,R}$. A red light beam $B0_{P3,R}$ may correspond to an image point P3, and may propagate in the direction of a wave vector $k0_{P3,R}$. A red light beam $B0_{P4,R}$ may correspond to an image point P4, and may propagate in the direction of a wave vector $k0_{P4,R}$.

A red light beam $B0_{P0,R}$ may correspond to a central image point P0, and may propagate in the direction of a wave vector $k0_{P0,R}$.

Also a blue light beam ($B0_{P1,B}$) may correspond to the image point P1, and may propagate in the direction of a wave vector ($k0_{P1,B}$).

The input light IN1 may be formed e.g. such that the direction ($k0_{P1,B}$) of propagation of the blue light beam ($B0_{P1,B}$) corresponding to a first corner point P1 of the input image IMG0 may be parallel with the direction $k0_{P1,R}$ of propagation of the red light beam $B0_{P1,R}$.

The input light IN1 may be formed e.g. such that the direction ($k0_{P2,B}$) of propagation of a blue light beam ($B0_{P2,B}$) corresponding to a second corner point P2 of the input image IMG0 may be parallel with the direction ($k0_{P2,R}$) of propagation of a red light beam ($B0_{P2,R}$), which corresponds to said second corner point P2.

The wave vector (k) of light may be defined as the vector having a direction of propagation of said light, and a magnitude given by $2\pi/\lambda$, where $\lambda$ is the wavelength of said light.

The light $B0_{P0,R}$ of the center point P0 may propagate in an axial direction ($k0_{P0,R}$). The axial direction ($k0_{P0,R}$) may be parallel with an optical axis (AX0) of the optical engine ENG1.

Figure 4A:
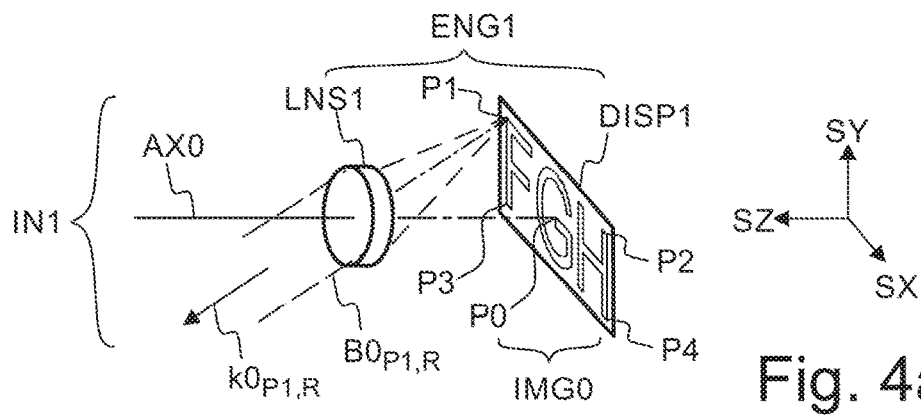
FIGS. 4a to 4e show, by way of example, in a three-dimensional view, forming input light beams by using an optical engine.
Figure 4B:
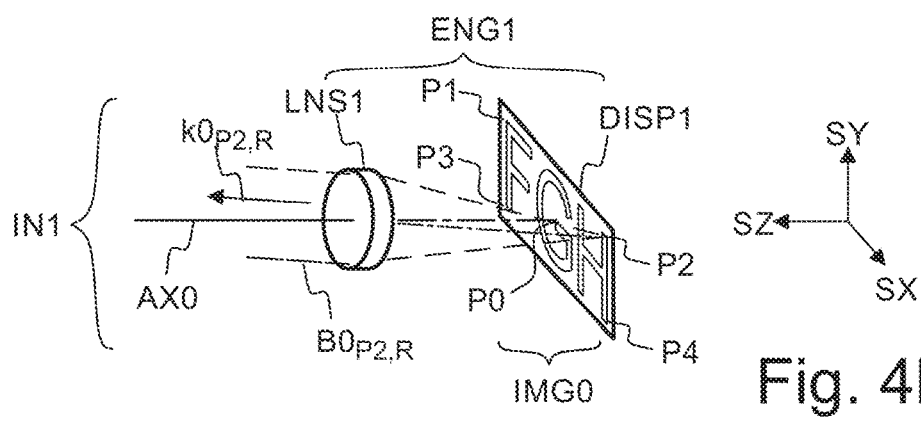
Figure 4C:
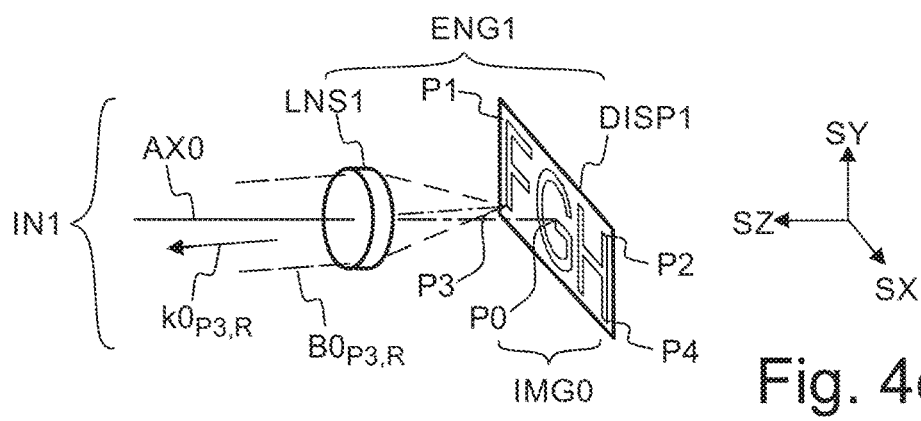
Figure 4D:
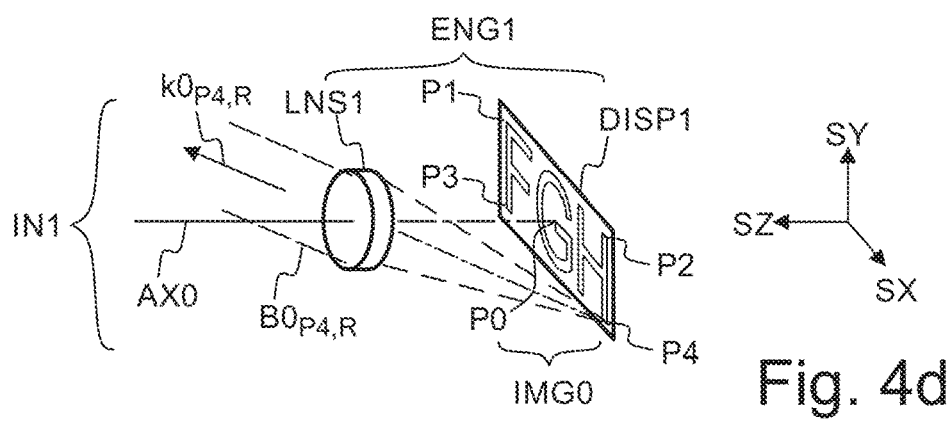
Figure 4E:
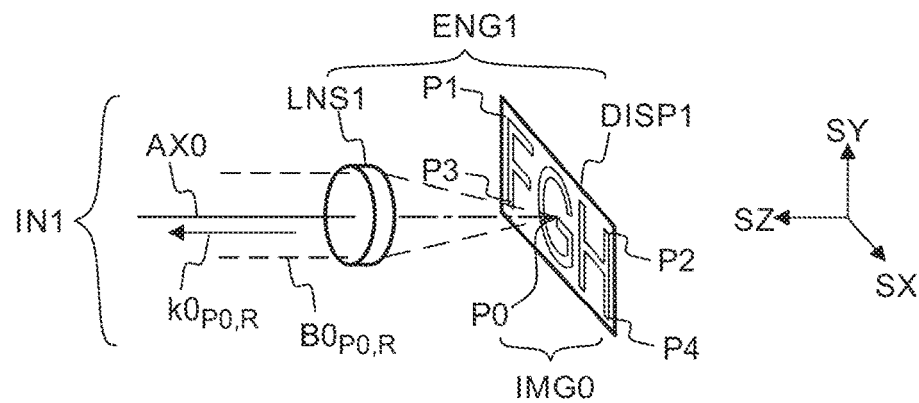
Figure 4F:
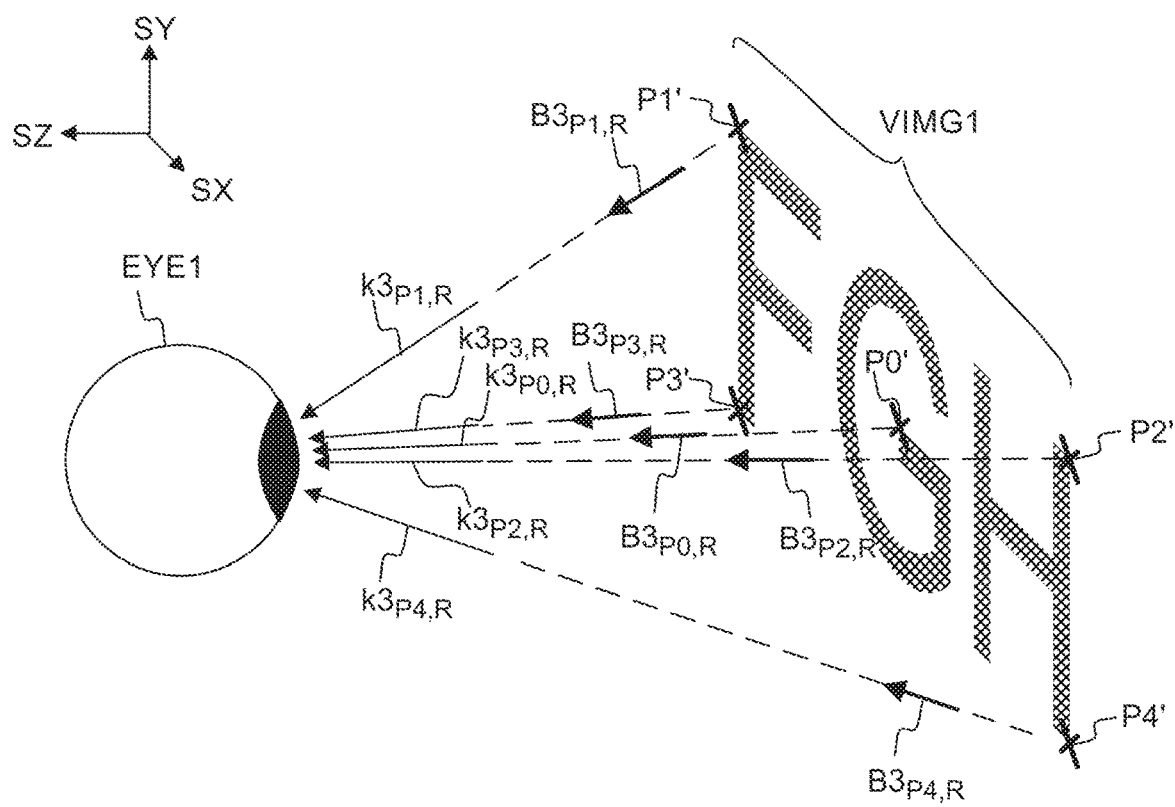
FIG. 4f shows, by way of example, in a three-dimensional view, viewing a displayed virtual image.

Referring to FIG. 4f, the output light OUT1 may comprise a plurality of output light beams $B3_{P1,R}$, $B3_{P2,R}$, ..., which may correspond to a displayed virtual image VIMG1. Each output beam $B3_{P1,R}$, $B3_{P2,R}$, ... may correspond to a point P1', P2', ... of the image. For example, a red light beam $B3_{P0,R}$ propagating in a direction of a wave vector $k3_{P0,R}$ may correspond to a point P0' of the image VIMG1. A red light beam $B3_{P1,R}$ propagating in a direction of a wave vector $k3_{P1,R}$ may correspond to a point P1' of the image VIMG1. A red light beam $B3_{P2,R}$ propagating in a direction of a wave vector $k3_{P2,R}$ may correspond to a point P2' of the image VIMG1. A red light beam $B3_{P3,R}$ propagating in a direction of a wave vector $k3_{P3,R}$ may correspond to a point P3'. A red light beam $B3_{P4,R}$ propagating in a direction of a wave vector $k3_{P4,R}$ may correspond to a point P4'.

The expander device EPE1 may form the output light OUT1 by expanding the exit pupil of the optical engine ENG1. The output light OUT1 may comprise a plurality of output light beams, which correspond to the displayed virtual image VIMG1. The output light OUT1 may impinge on the eye EYE1 of an observer such that the observer may see the displayed virtual image VIMG1.

The displayed virtual image VIMG1 may have a center point P0' and four corner points P1', P2', P3', P4'. The input light IN1 may comprise a plurality of partial light beams corresponding to the points P0, P1, P2, P3, P4 of the input image IMG0. The expander device EPE1 may form the point P0' of the displayed virtual image VIMG1 e.g. by diffracting and guiding light of the point P0 of the input image IMG0. The in-coupling element DOE1 may be arranged to diffract input light IN1 such that the guided light B1, B1a, B1b comprises light of a center point P0 of an input image IMG0. The out-coupling element DOE3, DOE3a, DOE3b may be arranged to diffract guided light B1, B1a, B1b received from the in-coupling element DOE1 such that the output light OUT1 comprises light of the center point P0.

The expander device EPE1 may form the points P1', P2', P3', P4' e.g. by diffracting and guiding light of the points P1, P2, P3, P4, respectively.

The expander device EPE1 may form output light OUT1, which comprises a plurality of light beams $B3_{P0,R}$, $B3_{P1,R}$, $B3_{P2,R}$, $B3_{P3,R}$, $B3_{P4,R}$ propagating in different directions specified by the wave vectors $k3_{P0,R}$, $k3_{P1,R}$, $k3_{P2,R}$, $k3_{P4,R}$.

A red light beam corresponding to the point P0' of the displayed virtual image VIMG1 has a wave vector $k3_{P0,R}$. A red light beam corresponding to the point P1' has a wave vector $k3_{P1,R}$. A red light beam corresponding to the point P2' has a wave vector $k3_{P2,R}$. A red light beam corresponding to the point P3' has a wave vector $k3_{P3,R}$. A red light beam corresponding to the point P4' has a wave vector $k3_{P4,R}$.

The expander device EPE1 may expand input light IN1 such that each output light beam $B3_{P1,R}$, $B3_{P2,R}$, $B3_{P3,R}$, ... may propagate in the same direction as the corresponding input light beam $B0_{P1,R}$, $B0_{P2,R}$, $B0_{P3,R}$, .... For example, the expander device EPE1 may form an output light beam $B3_{P1,R}$ from light of an input light beam $B0_{P1,R}$ such that the output light beam $B3_{P1,R}$ propagates in the same direction as the input light beam $B0_{P1,R}$. The light beams $B0_{P1,R}$, $B3_{P1,R}$ may correspond to the same point P1 of the input image IMG0. For example, the expander device EPE1 may form an output light beam $B3_{P2,R}$ from light of an input light beam $B0_{P2,R}$ such that the output light beam $B3_{P2,R}$ propagates in the same direction as the input light beam $B0_{P2,R}$. The light beams $B0_{P2,R}$, $B3_{P2,R}$ may correspond to the same point P2 of the input image IMG0.

The expander device EPE1 may be arranged to operate such that the wave vector $k3_{P1,R}$ is parallel with the wave vector $k0_{P1,R}$ of red light of the point P1 in the input light IN1. The wave vector $k3_{P2,R}$ may be parallel with the wave vector $k0_{P0,R}$ of the point P0. The wave vector $k3_{P2,R}$ may be parallel with the wave vector $k0_{P2,R}$ of the point P2. The wave vector $k3_{P3,R}$ may be parallel with the wave vector $k0_{P3,R}$ of the point P3. The wave vector $k3_{P4,R}$ may be parallel with the wave vector $k0_{P4,R}$ of the point P4.

Figure 4G:
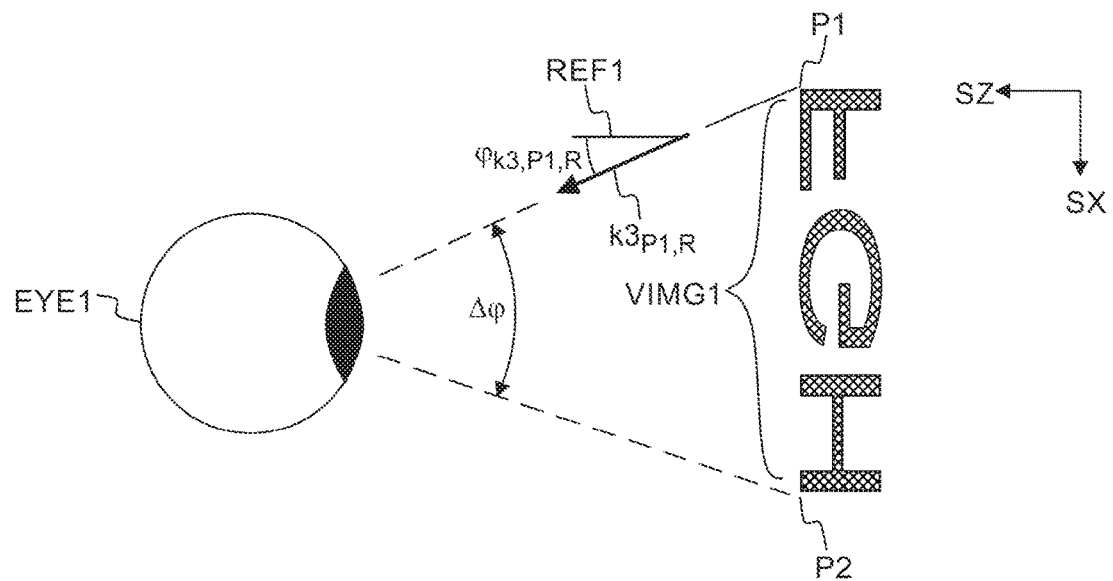
FIG. 4g shows, by way of example, angular width of the displayed virtual image.
Figure 4H:
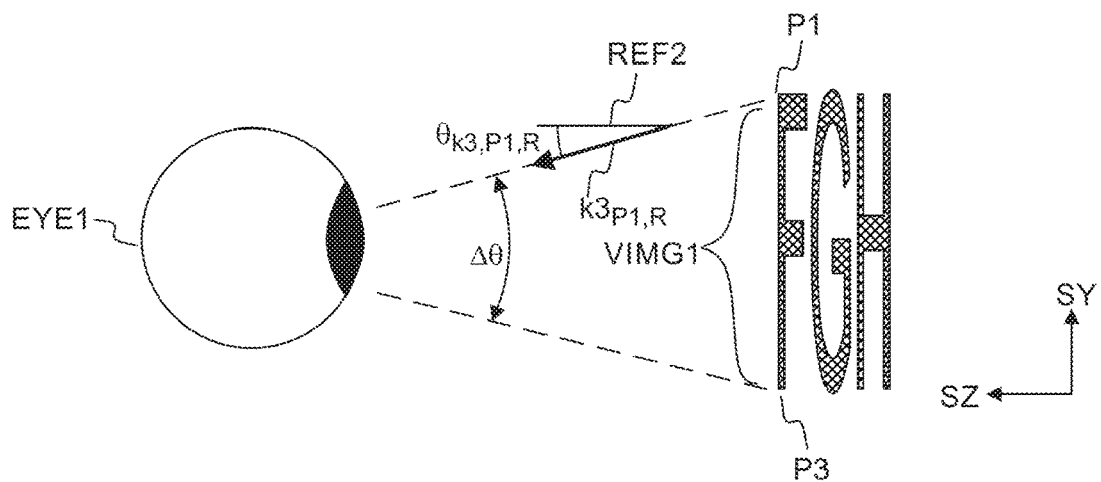
FIG. 4h shows, by way of example, angular height of the displayed virtual image.

Referring to FIGS. 4g and 4h, the displayed virtual image VIMG1 has an angular width $\Delta\varphi$ and an angular height $\Delta\theta$.

The displayed virtual image VIMG1 may have a first corner point P1' e.g. at the left-hand side of the image VIMG1, and a second corner point P2' e.g. at the right-hand side of the image VIMG1. The angular width $\Delta\varphi$ of the virtual image VIMG1 may be equal to the horizontal angle between the wave vectors $k3_{P1,R}$, $k3_{P2,R}$ of the corner points P1', P2'.

The displayed virtual image VIMG1 may have an upper corner point P1' and a lower corner point P3'. The angular height $\Delta\theta$ of the virtual image VIMG1 may be equal to the vertical angle between the wave vectors $k3_{P1,R}$, $k3_{P3,R}$ of the corner points P1', P3'.

The direction of a wave vector may be specified e.g. by orientation angles $\varphi$ and $\theta$. The angle $\varphi$ may denote an angle between the wave vector and a reference plane REF1. The reference plane REF1 may be defined e.g. by the directions SZ and SY. The angle $\theta$ may denote an angle between the wave vector and a reference plane REF2. The reference plane REF2 may be defined e.g. by the directions SZ and SX.

Figure 4I:
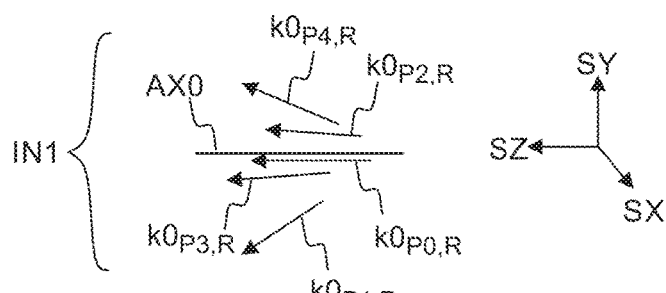
FIG. 4i shows, by way of example, wave vectors of input light beams.

Referring to FIG. 4i, the input light IN1 may comprise red light (R), green light (G) and/or blue light (B). For example, the input light IN1 may comprise blue input light beams, which have wave vectors $k0_{P0,B}$, $k0_{P1,B}$, $k0_{P2,B}$, $k0_{P3,B}$, $k0_{P4,B}$, corresponding to blue points P0, P1, P2, P3, P4 of the image IMG0. The notation $k0_{P2,B}$ may refer to the wave vector of an input light beam B0, which has blue color (B), and which corresponds to an image point P2. The expander device EPE1 may form blue output light beams from the blue input light beams such that the wave vector of each blue output light beams is parallel with the wave vector of the corresponding blue input light beam.

Figure 5:
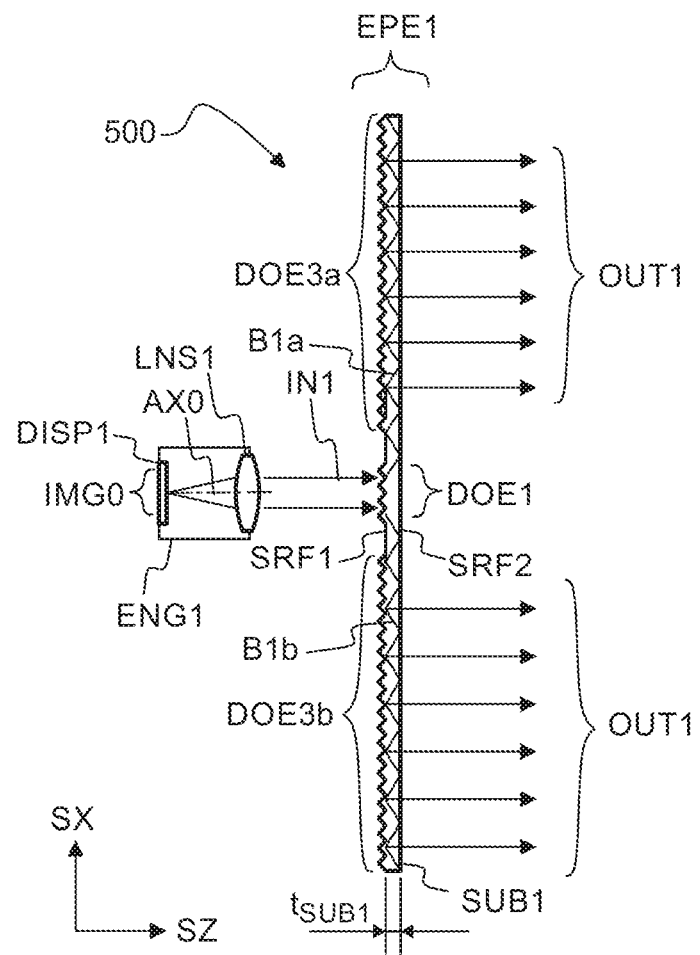
FIG. 5 shows, by way of example, in a cross-sectional side view, propagation of guided light in the waveguide plate.

Referring to FIG. 5, the optical engine ENG1 may form an input image IMG0 and may convert the input image IMG0 into a plurality of light beams of the input light IN1. The engine ENG1 may be optically coupled to the in-coupling element DOE1 of the expander EPE1. The one or more light beams provided by the engine ENG1 may be coupled to the expander EPE1 as input light IN1. The input light IN1 may be optically coupled to the in-coupling element DOE1 of the expander device EPE1.

The input image IMG0 may be represent displayed information. The input image IMG0 may be represent e.g. graphics and/or text. The input image IMG0 may be represent e.g. video. The engine ENG1 may be arranged to generate still images and/or video. The engine ENG1 may generate a real primary image IMG0 from a digital image. The engine ENG1 may receive one or more digital images e.g. from an internet server or from a smartphone.

The expander device EPE1 may carry virtual image content from the light engine ENG1 to the front of a user's eye EYE1. The expander device EPE1 may expand the viewing pupil, thus enlarging the eye box.

The engine ENG1 may comprise a micro-display DISP1 to generate an input image IMG0. The micro-display DISP1 may comprise a two-dimensional array of light-emitting pixels. The engine ENG1 may comprise e.g. one or more light emitting diodes (LED). The display DISP1 may comprise e.g. one or more micro display imagers, such as liquid crystal on silicon (LCOS), liquid crystal display (LCD), digital micromirror device (DMD). The display DISP1 may generate an input image IMG0 e.g. at a resolution of 1280×720 (HD). The display DISP1 may generate an input image IMG0 e.g. at a resolution of 1920×1080 (Full HD). The display DISP1 may generate an input image IMG0 e.g. at a resolution of 3840×2160 (4K UHD). The input image IMG0 may comprise a plurality of image points P0, P1, P 2, . . . . The engine ENG1 may comprise collimating optics LNS1 to form a different light beam from each image pixel. The engine ENG1 may comprise collimating optics LNS1 to form a substantially collimated light beam from light of an image point P0. The center of the display DISP1 and the center of the optics LNS1 may together define an optical axis AX0 of the engine ENG1. The center point P0 and the center of the optics LNS1 may define the optical axis AX0.

The plate SUB1 may have a first major surface SRF1 and a second major surface SRF2. The surfaces SRF1, SRF2 may be substantially parallel with the plane defined by the directions SX and SY.

The waveguide plate SUB1 may comprise or consist essentially of transparent solid material. The plate SUB1 may comprise e.g. glass, polycarbonate or polymethyl methacrylate (PMMA). The diffractive optical elements DOE1, DOE3a, DOE3b, DOE3c, DOE3d may be formed e.g. by molding, embossing, and/or etching. The diffractive optical elements may be implemented e.g. by one or more surface diffraction gratings or by one or more volume diffraction gratings.

The waveguide plate may have a thickness $t_{SUB1}$. The waveguide plate comprises a planar waveguiding core. In an embodiment, the plate SUB1 may optionally comprise e.g. one or more cladding layers, one or more protective layers, and/or one or more mechanically supporting layers. The thickness $t_{SUB1}$ may refer to the thickness of a planar waveguiding core of the plate SUB1.

Figure 6:
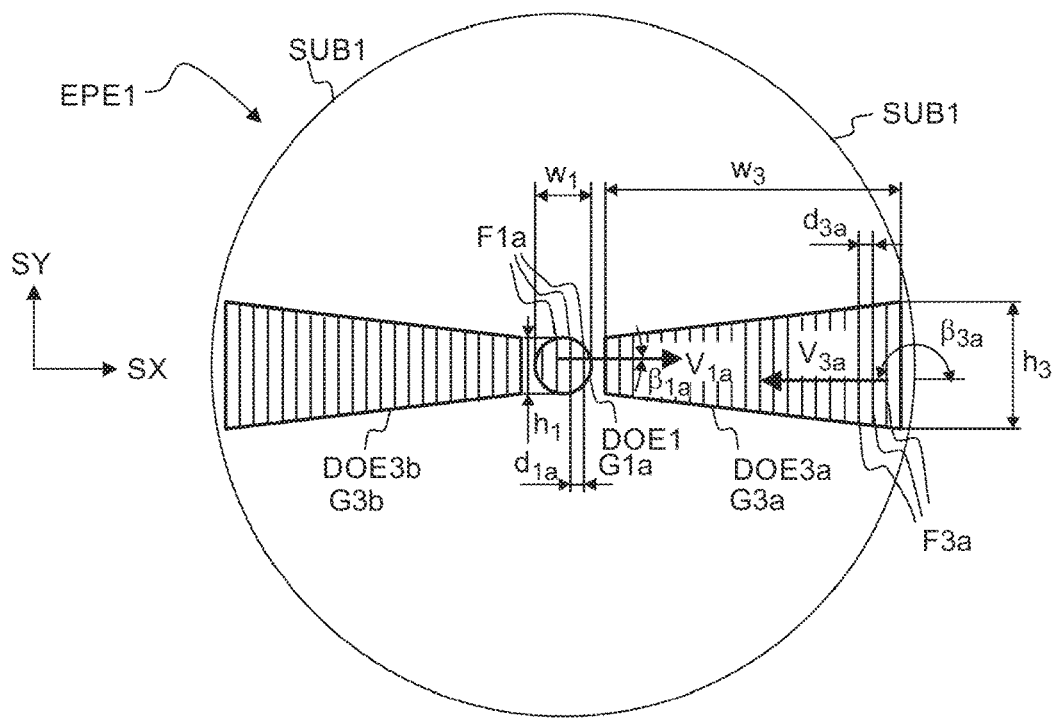
FIG. 6 shows, by way of example, in an axial view, dimensions of diffractive elements.

Referring to FIG. 6, each element DOE1, DOE3a, DOE3b, DOE3c, DOE3d may comprise one or more diffraction gratings to diffract light.

For example, the in-coupling element DOE1 may comprise one or more gratings G1a. For example, the out-coupling element DOE3a may comprise a grating G3a. For example, the out-coupling element DOE3b may comprise a grating G3b.

A grating period (d) of a diffraction grating and the orientation ($\beta$) of the diffractive features of the diffraction grating may be specified by a grating vector V of said diffraction grating. The diffraction grating comprises a plurality of diffractive features (F1a, F3a) which may operate as diffractive lines. The diffractive features may be e.g. microscopic ridges or grooves. The diffractive features may also be e.g. microscopic protrusions (or recesses), wherein adjacent rows of protrusions (or recesses) may operate as diffractive lines. The grating vector V may be defined as a vector having a direction perpendicular to diffractive lines of the diffraction grating and a magnitude given by $2\pi/d$, where d is the grating period. The grating period means the same as the grating period length. The grating period may be the length between consecutive diffractive features of the grating. The grating period may be equal to a unit length divided by the number of diffractive features located within said unit length. The grating periods $d_{1a}$ of the in-coupling element DOE1 may be e.g. in the range of 330 nm to 450 nm. The optimum value of a grating period d may depend e.g. on the refractive index of the plate SUB1 and on the wavelength $\lambda$ of the diffracted light.

The in-coupling element DOE1 may have a grating vector $V_{1a}$ to form the first guided light B1a. The first element DOE1 may have first diffractive features F1a to provide a grating G1a which has a grating period $d_{1a}$ and an orientation $\beta_{1a}$ with respect to a reference direction SX. The diffractive features may be e.g. microscopic ridges or microscopic protrusions.

The out-coupling element DOE3a may have a grating vector $V_{3a}$ to couple the guided light B1a out of the plate SUB1. The out-coupling element DOE3a may have diffractive features F3a to provide a grating G3a which has a grating period $d_{3a}$ and an orientation $\beta_{3a}$ with respect to the reference direction SX.

The grating vector $V_{1a}$ has a direction $\beta_{1a}$ and a magnitude $2\pi/d_{1a}$. The grating vector $V_{3a}$ has a direction $\beta_{3a}$ and a magnitude $2\pi/d_{3a}$. The direction ($\beta$) of a grating vector may be specified e.g. by the angle between said vector and a reference direction (e.g. direction SX).

The grating periods (d) and the orientations ($\beta$) of the diffraction gratings of the optical elements may be selected such that the direction ($k3_{P0,R}$) of propagation of light of the center point P0 in the output light OUT1 is parallel with the direction ($k0_{P0,R}$) of propagation of light of the center point P0 in the input light IN1.

The grating periods (d) and the orientations ($\beta$) of the diffraction gratings of the optical elements DOE1, DOE3a, DOE3b, DOE3c, DOE3d may be selected such that the direction of each light beam of the output light OUT1 may be parallel with the direction of the corresponding light beam of the input light IN1.

Figure 7:
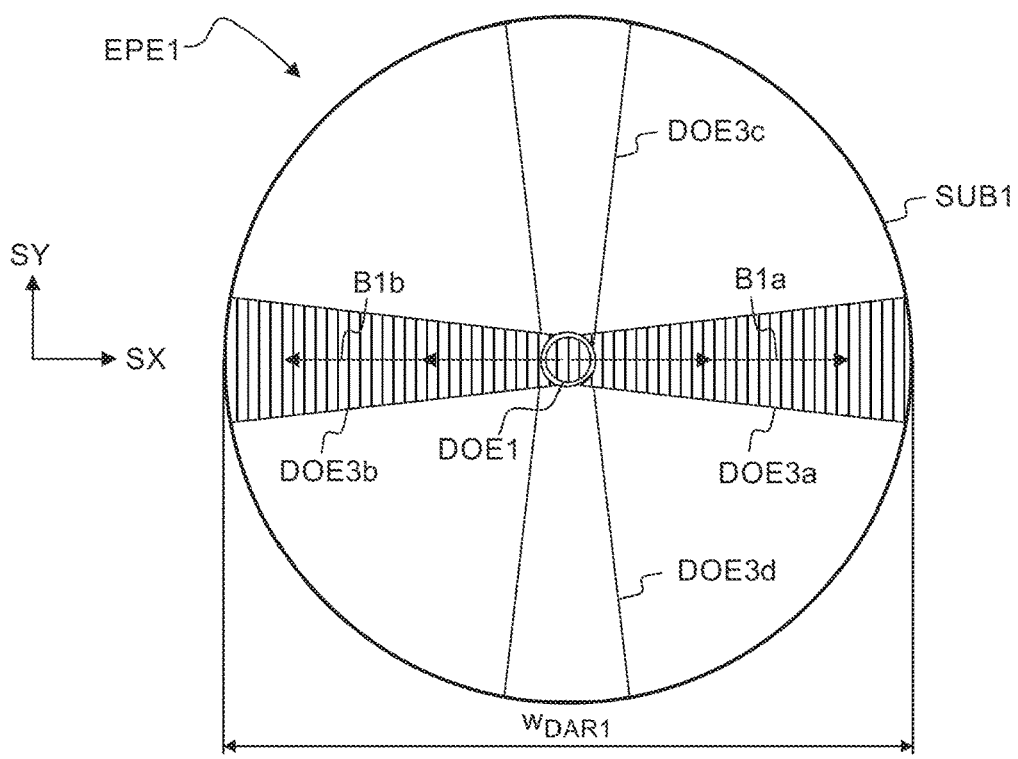
FIG. 7 shows, by way of example, in an axial view, a pair of out-coupling elements.

Referring to FIG. 7, the out-coupling elements DOE3a, DOE3b may together constitute a first pair of out-coupling elements. The out-coupling elements DOE3c, DOE3d may together constitute a second pair of out-coupling elements.

The expander device EPE1 may be mechanically balanced with respect to the axis AX1 of rotation, so as to minimize or eliminate mechanical vibration caused by the rotation of the expander device EPE1.

The expander device EPE1 may be statically balanced so that the center of gravity of the expander device EPE1 may be on the axis AX1 of rotation.

The expander device EPE1 may be dynamically balanced so that rotation about the axis AX1 does not generate any resultant centrifugal force. The expander device EPE1 may be dynamically balanced so that rotation about the axis AX1 does not generate any significant resultant centrifugal force.

Referring to FIG. 8a to 8c, also the in-coupling element DOE1 may be arranged to provide output light OUT1, in addition to the out-coupling elements dOE3qa, DOE3b, DOE3c, DOE3d. For example, a part of the input light IN1 may be transmitted through the expander device EPE1 in the axial direction AX1. The in-coupling element DOE1 may form a central portion OUT1C of the output light OUT1 by diffracting guided light B1 out of the waveguide plate SUB1 and/or by allowing a part of the input light IN1 to pass through the expander device EPE1. Consequently, the display apparatus 500 may provide a continuous circular display region DAR1 so that the display region DAR1 does not have a dark center.

The transmitted input light IN1 may have a high intensity and the transmitted input light IN1 could cause a disturbing dazzling effect to the eye EYE1 of the user. The display apparatus 500 may be arranged to operate such that the intensity of output light OUT1C provided by the in-coupling element DOE1 is substantially equal to the effective intensity of output light OUT1 provided by the out-coupling element DOE3a, DOE3b. The display apparatus 500 may optionally comprise a filter FIL1 to attenuate the intensity of the output light OUT1C provided by the in-coupling element DOE1. The filter FIL1 may be implemented e.g. by depositing a semi-reflective layer and/or an absorbing layer on the major surface SRF2 of the expander device EPE1.

The actuating mechanism MOTOR1 may be a motor. The motor MOTOR1 and the optical engine ENG1 may be on the same side of the expander device EPE1. The display apparatus 500 may comprise a data transmission line BUS1, which is arranged to transmit image data DATA1 to the optical engine ENG1 through the motor MOTOR1.

Referring to FIG. 8b, the actuator MOTOR1 may be a motor MOTOR1, which has an inner rotating rotor ROTO1 and an outer stationary stator STAT1. The stator STAT1 may be stationary with respect to the base BASE1. The rotor ROTO1 may rotate with respect to the base BASE1. The motor MOTOR1 and the optical engine ENG1 may be positioned on the rear side of the expander device EPE1, so that the motor MOTOR1 does not block the central region of the display region DAR1. The motor MOTOR1 may be arranged to rotate the expander device EPE1 so that the motor MOTOR1 does not block the central region of the display region DAR1.

The display apparatus 500 may comprise a data transmission line BUS1, which is arranged to transmit image data DATA1 through the motor MOTOR1 to the display DISP1 of the optical engine ENG1. The display apparatus 500 may comprise a feedthrough FEED1 for transmitting image data DATA1. The feedthrough FEED1 may comprise a data transmission line BUS1, which passes through a central opening HOL1 of the motor MOTOR1. The central opening HOL1 may also accommodate a stationary supporting element CE1 for mechanically supporting the optical engine ENG1. For example, the rotor ROTO1 may have a hollow rotating shaft, which has the central opening HOL1. The stationary supporting element CE1 may pass through the central opening HOL1.

The stator STAT1 may be directly or indirectly fixed to the base BASE1. The display DISP1 may be supported such that the display DISP1 is stationary with respect to the base BASE1. The stationary supporting element CE1 may mechanically connect the optical engine ENG1 to the base BASE1 via the central opening HOL1 of the motor MOTOR1. The connecting element CE1 may be directly or indirectly connected to the base BASE1. The supporting element CE1 may keep the display DISP1 stationary with respect to the base BASE1. For example, the supporting element CE1 may be a shaft, which connects the optical engine ENG1 to the base BASE1. The central opening HOL1 may also accommodate a signal transmission line BUS1 for transmitting image data DATA1 to the display DISP1. The transmission line BUS1 may be an electrical and/or optical data transmission line. A second supporting element CE2 may transmit the rotating movement of the rotor ROT1 to the expander device EPE1. The second rotating supporting element CE2 may mechanically connect the rotating rotor ROTO1 to the rotating expander device EPE1. The supporting element CE2 may partly or completely surround the optical engine ENG1.

Referring to FIG. 8c, the actuator MOTO1 may be a motor MOTOR1, which has an outer rotating rotor ROTO1 and an inner stationary stator STAT1. The stator STAT1 may be stationary with respect to the base BASE1. The rotor ROTO1 may rotate with respect to the base BASE1. The motor MOTOR1 and the optical engine ENG1 may be positioned on the rear side of the expander device EPE1, so that the motor MOTOR1 does not block the central region of the display region DAR1. The motor MOTOR1 may be arranged to rotate the expander device EPE1 so that the motor MOTOR1 does not block the central region of the display region DAR1.

The display apparatus 500 may comprise a data transmission line BUS1, which is arranged to transmit image data DATA1 through the motor MOTOR1 to the display DISP1 of the optical engine ENG1. The transmission line BUS1 may be an electrical and/or optical data transmission line. The display apparatus 500 may comprise a feedthrough FEED1 for transmitting image data DATA1. For example, the feedthrough FEED1 may be implemented by arranging the signal transmission line BUS1 to pass through the inner stationary stator STAT1 of the motor MOTOR1. The transmission line BUS1 may pass e.g. through an opening HOL1 of the stator STAT1.

The display DISP1 may be supported such that the display DISP1 is stationary with respect to the base BASE1. The stator STAT1 may be directly or indirectly fixed to the base BASE1. A stationary supporting element CE1 may mechanically connect the optical engine ENG1 to the base BASE1 directly or via the stator STAT1. The connecting element CE1 may be directly or indirectly connected to the base BASE1. The supporting element CE1 may keep the display DISP1 stationary with respect to the base BASE1.

A second supporting element CE2 may transmit the rotating movement of the outer rotor ROT1 to the expander device EPE1. The second rotating supporting element CE2 may mechanically connect the rotating rotor ROTO1 to the rotating expander device EPE1. The supporting element CE2 may partly or completely surround the optical engine ENG1.

Referring to FIG. 9a, the expander device EPE1 may comprise four main out-coupling elements DOE3a, DOE3b, DOE3c, DOE3d. The in-coupling element DOE1 may be located between a first main out-coupling element DOE3a and a third out-coupling element DOE3b, and the in-coupling element DOE1 may be located between a second main out-coupling element DOE3c and a fourth out-coupling element DOE3d.

The in-coupling element DOE1 may provide guided light B1a, B1b, B1c, B1d to four directions, i.e. to a first direction, to the opposite direction, and to two transverse directions.

The first main out-coupling element DOE3a may diffract first guided light B1a out of the substrate plate SUB1. The second main out-coupling element DOE3c may diffract second guided light B1c out of the substrate plate SUB1. The third main out-coupling element DOE3b may diffract third guided light B1b out of the substrate plate SUB1. The fourth main out-coupling element DOE3d may diffract fourth guided light B1d out of the substrate plate SUB1.

Referring to FIG. 9b, the expander device EPE1 may comprise one or more intermediate out-coupling elements DOE3e, DOE3f, DOE3g, DOE3h. The expander device EPE1 may comprise one or more intermediate out-coupling elements DOE3e, DOE3f, DOE3g, DOE3h instead of, or in addition to one or more main out-coupling elements DOE3a, DOE3b, DOE3c, DOE3d.

The in-coupling element DOE1 may form guided light B1a, B1b, B1c, B1d in the main directions specified by the grating vectors $V_{1a}$, $V_{1b}$, $V_{1c}$, $V_{1d}$ of the in-coupling element DOE1. In addition, the in-coupling element DOE1 may form intermediate guided light B1e, B1f, B1g, B1h in intermediate directions specified by the vector sum of grating vectors of the in-coupling element DOE1.

The intermediate out-coupling elements DOE3e, DOE3f, DOE3g, DOE3h may couple intermediate guided light B1e, B1f, B1g, B1h out of the waveguide plate SUB1.

The main out-coupling elements DOE3a, DOE3b, DOE3c, DOE3d and the intermediate out-coupling elements DOE3e, DOE3f, DOE3g, DOE3h may be positioned around the in-coupling element DOE1.

An intermediate out-coupling element DOE3e may be located between the main out-coupling elements DOE3a, DOE3c. An intermediate out-coupling element DOE3f may be located between the main out-coupling elements DOE3b, DOE3d. An intermediate out-coupling element DOE3g may be located between the main out-coupling elements DOE3b, DOE3c. An intermediate out-coupling element DOE3h may be located between the main out-coupling elements DOE3a, DOE3d.

The in-coupling element DOE1 may be located between intermediate out-coupling elements DOE3e, DOE3f. The in-coupling element DOE1 may be located between intermediate out-coupling elements DOE3g, DOE3h.

Referring to FIG. 9c, each out-coupling element may form a portion of the output light OUT1. The out-coupling element DOE3a may form a portion B3a of output light OUT1 by diffracting guided light B1a out of the substrate plate SUB1. The out-coupling element DOE3b may form a portion B3b by diffracting guided light B1b. The out-coupling element DOE3c may form a portion B3c by diffracting guided light B1c. The out-coupling element DOE3d may form a portion B3d by diffracting guided light B1d.

The out-coupling element DOE3e may form a portion B3e by diffracting guided light B1e. The out-coupling element DOE3f may form a portion B3f by diffracting guided light B1f. The out-coupling element DOE3g may form a portion B3g by diffracting guided light B1g. The out-coupling element DOE3h may form a portion B3h by diffracting guided light B1h.

The grating vectors of the out-coupling elements are selected such that light beams of the different portions B3a, B3b, B3c, B3d, B3e, B3f, B3g, B3h of the output light are parallel with each other, in a situation where said light beams correspond to the same image point of the displayed image.

Figure 9D:
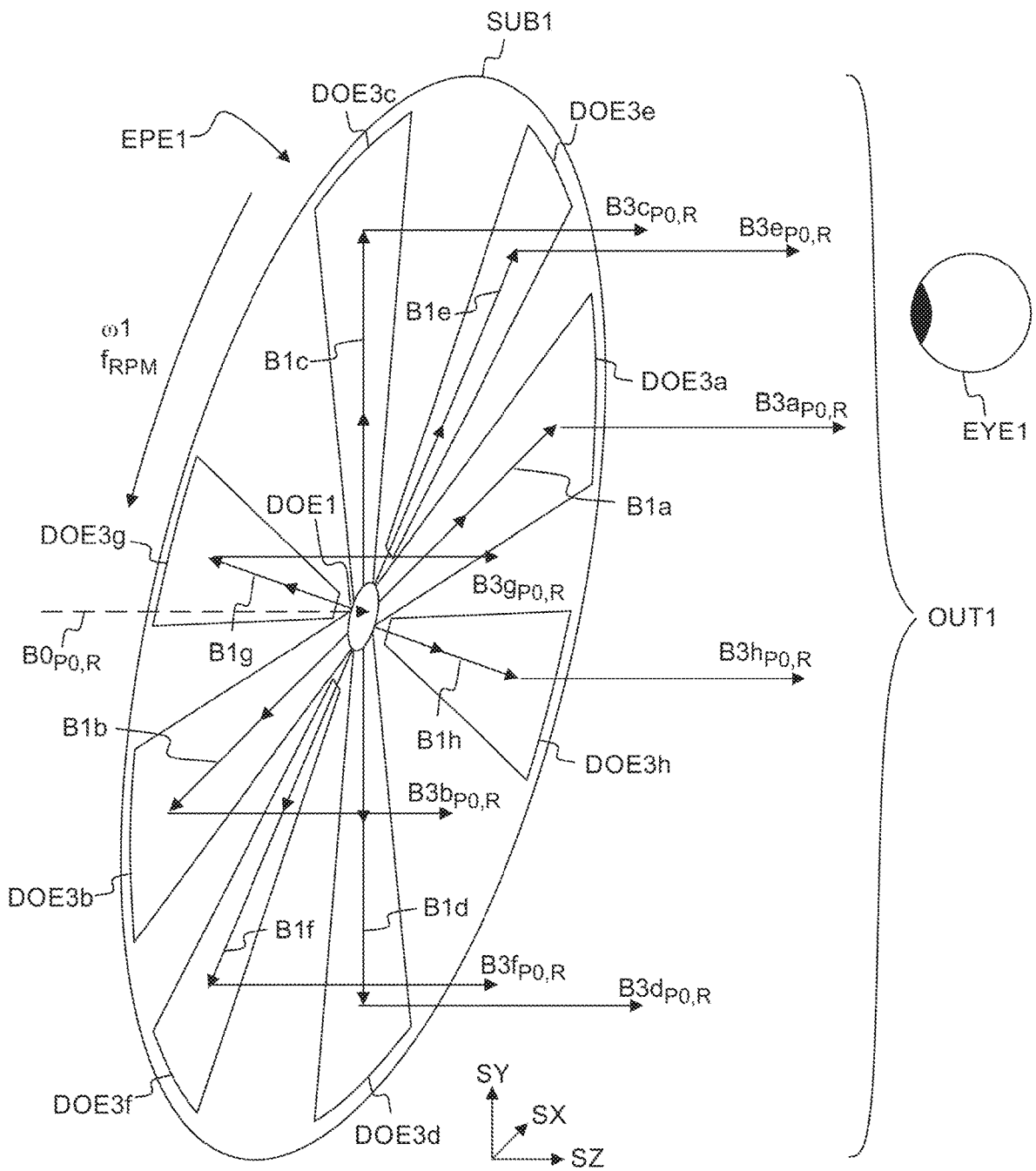
FIG. 9d shows, by way of example, forming mutually parallel output light beams, which correspond to the same image point.

Referring to FIG. 9d, the out-coupling elements may form output light beams such that the direction and the intensity of each output light beam may correspond to the position and the brightness of the corresponding image point of the displayed image VIMG1.

For example, each out-coupling element DOE3a, DOE3b, DOE3c, DOE3d, DOE3e, DOE3f, DOE3g, DOE3h may form an output light beam such that the output light beams ($B3a_{P0,R}$, $B3b_{P0,R}$, $B3c_{P0,R}$, $B3d_{P0,R}$, $B3e_{P0,R}$, $B3f_{P0,R}$, $B3g_{P0,R}$, $B3h_{P0,R}$) formed by the different out-coupling elements are parallel with each other, in a situation where the output light beams correspond to the same image point (P0) of the displayed image VIMG1. The subscript "R" may refer to red color.

The parallel output light beams may ensure that the displayed image point (P0) visually appears as a single point, and the parallel output light beams may also ensure that rotation of the expander device EPE1 does not cause visually detectable shifting of the displayed image point (P0).

Figure 10A:
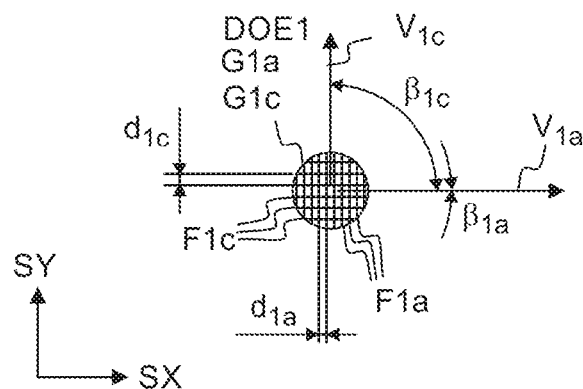
FIG. 10a shows, by way of example, in an axial view, a first main grating vector and a second main grating vector of the in-coupling element.

Referring to FIG. 10a, the in-coupling element DOE1 may have a first grating vector $V_{1a}$ and a second grating vector $V_{1c}$. The magnitude of the first grating vector $V_{1a}$ may be determined by a grating period $d_{1a}$ of a diffraction grating G1a of the in-coupling element DOE1. The orientation of the first grating vector $V_{1a}$ may be specified by an angle $\beta_{1a}$ with respect to a reference direction.

The reference direction may be e.g. the direction of the first grating vector $V_{1a}$, in which case the orientation angle $\beta_{1a}$ is equal to zero (i.e. $\beta_{1a}=0°$).

The reference direction may also be e.g. the direction SX in a situation where rotation of the expander device EPE1 is stopped. The expander device EPE1 may be rotated and stopped such that the first grating vector $V_{1a}$ is parallel with the direction SX.

The magnitude of the second grating vector $V_{1c}$ may be determined by a grating period $d_{1c}$ of a diffraction grating G1c of the in-coupling element DOE1. The orientation of the second grating vector $V_{1c}$ may be specified by an angle $\beta_{1c}$ with respect to the reference direction (e.g. SX).

The diffraction grating G1a may comprise diffractive features F1a. The diffraction grating G1c may comprise diffractive features F1c. The diffractive features F1a, F1c may be e.g. microscopic ridges or grooves (see FIG. 12a).

Figure 12A:
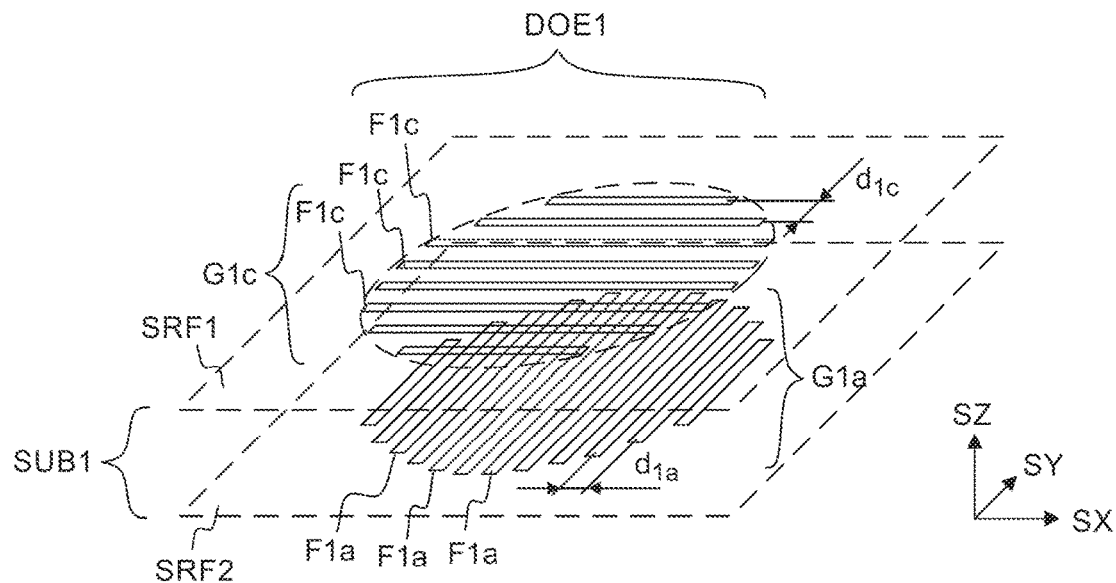
FIG. 12a shows, by way of example, in a three-dimensional view, an in-coupling element, which comprises a crossed grating.
Figure 12B:
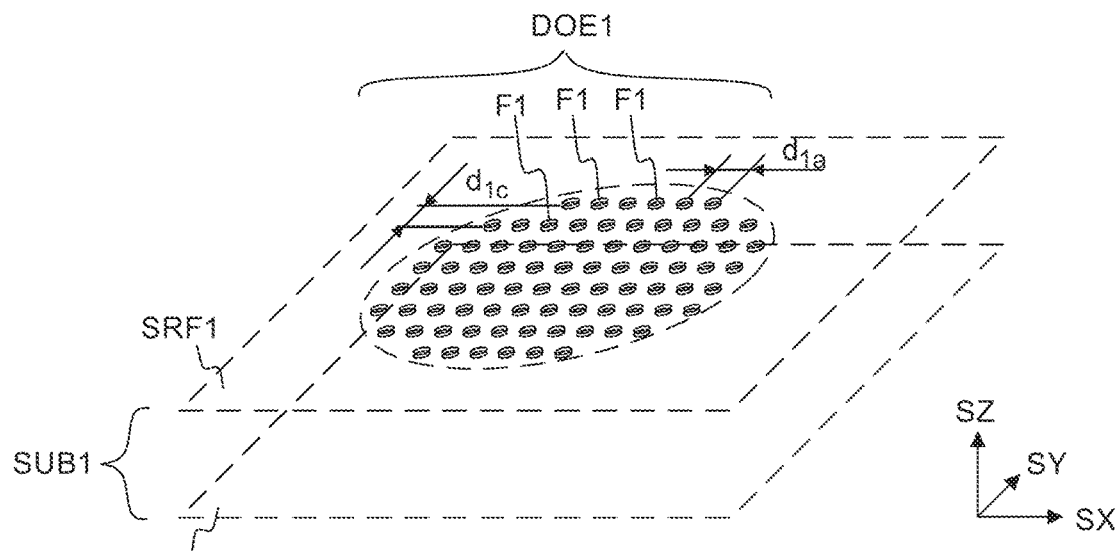
FIG. 12b shows, by way of example, in a three-dimensional view, an in-coupling element, which comprises a first grating region and a second grating region.

The in-coupling element DOE1 may also comprise a crossed grating G1 implemented by a two-dimensional array of diffractive features F1 (see FIG. 12b).

In an embodiment, the in-coupling element DOE1 may have two different grating periods $d_{1a}$, $d_{1c}$ to optimize operation with multi-color light. A first grating period $d_{1a}$ may allow displaying a first color component of a wide image (e.g. green, G). A second different grating period $d_{1c}$ may allow displaying a second color component of the wide image (e.g. red, R). The magnitude of the transverse grating vector $V_{1c}$ may be different from the magnitude of the grating vector $V_{1a}$, so as to facilitate displaying multi-color images.

In an embodiment, the first grating period $d_{1a}$ of the in-coupling element DOE1 may be equal to the second grating period $d_{1c}$ of the in-coupling element DOE1. The magnitude of the first grating vector $V_{1a}$ of the in-coupling element DOE1 may be equal to the magnitude of the second grating vector $V_{1c}$ of the in-coupling element DOE1. In that case the rotating expander device EPE1 may comprise e.g. four or more out-coupling elements DOE3a, DOE3b, DOE3c, DOE3d to reduce visually detectable flickering and/or to allow using a reduced rotation speed of the expander device EPE1.

Figure 10B:
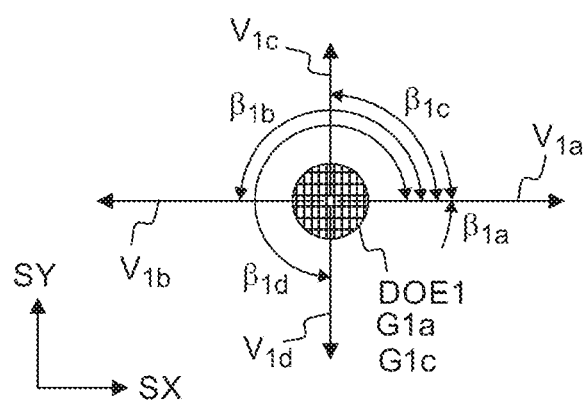
FIG. 10b shows, by way of example, in an axial view, four main grating vectors of the in-coupling element.

Referring to FIG. 10b, the in-coupling element DOE1 may also have a third grating vector $V_{1b}$ and a fourth grating vector $V_{1d}$. The magnitude of the third grating vector $V_{1b}$ may be equal to the magnitude of the first grating vector $V_{1a}$, and the direction of the third grating vector $V_{1b}$ may be opposite to the direction of the first grating vector $V_{1a}$. The magnitude of the fourth grating vector $V_{1d}$ may be equal to the magnitude of the second grating vector $V_{1c}$, and the direction of the fourth grating vector $V_{1d}$ may be opposite to the direction of the second grating vector $V_{1b}$.

The magnitude of the third grating vector $V_{1b}$ may be determined by the grating period $d_{1a}$. The orientation of the third grating vector $V_{1b}$ may be specified by an angle $\beta_{1b}$ with respect to the reference direction (e.g. SX).

The magnitude of the fourth grating vector $V_{1d}$ may be determined by the grating period $d_{1c}$. The orientation of the fourth grating vector $V_{1d}$ may be specified by an angle $\beta_{1d}$ with respect to the reference direction (e.g. SX).

Figure 10C:
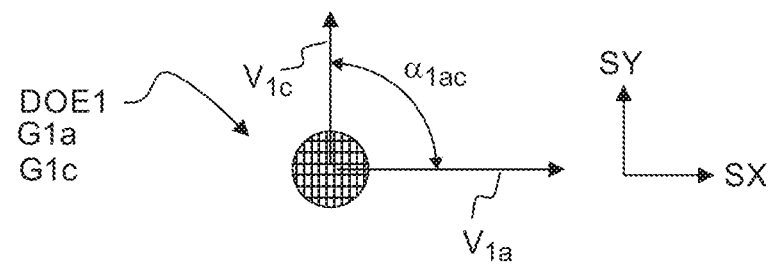
FIG. 10c shows, by way of example, in an axial view, the angle between the first main grating vector and the second main grating vector of the in-coupling element.

Referring to FIG. 10c, the angle $\alpha_{1ac}$ between the grating vectors $V_{1a}$, $V_{1c}$ may be e.g. in the range of 600 to 120°. In particular, the angle $\alpha_{1ac}$ may substantially equal to 90°. In particular, the angle $\alpha_{1ac}$ may equal to 90°.

Figure 11A:
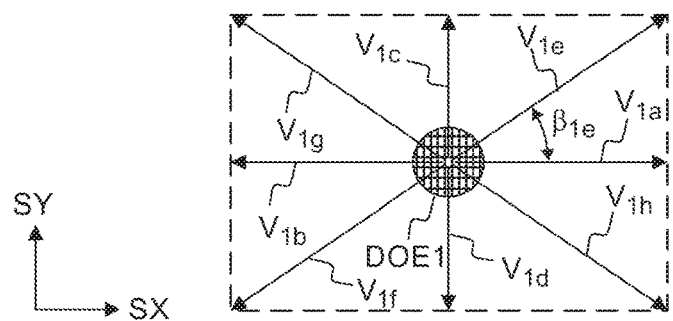
FIG. 11a shows, by way of example, in an axial view, forming four intermediate grating vectors, wherein a first intermediate grating vector is formed as vector sum of the first main grating vector and the second main grating vector.

Referring to FIG. 11a, the in-coupling element DOE1 may also provide intermediate guided light to intermediate directions specified by the vector sum of the grating vectors of the in-coupling element DOE1. In particular, the in-coupling element DOE1 may provide first intermediate guided light B1e to an intermediate direction specified by the vector sum $V_{1a}+V_{1b}$. The in-coupling element DOE1 may provide second intermediate guided light B1f to an intermediate direction specified by the vector sum $V_{1b}+V_{1d}$. The in-coupling element DOE1 may provide third intermediate guided light B1g to an intermediate direction specified by the vector sum $V_{1b}+V_{1c}$. The in-coupling element DOE1 may provide fourth intermediate guided light B1h to an intermediate direction specified by the vector sum $V_{1a}+V_{1d}$.

The magnitude of the first grating vector $V_{1a}$ may be equal to or different from the magnitude of the first grating vector $V_{1c}$. The orientation angle $\beta_{1e}$ of the first intermediate direction may also be different from 45°.

Figure 11B:
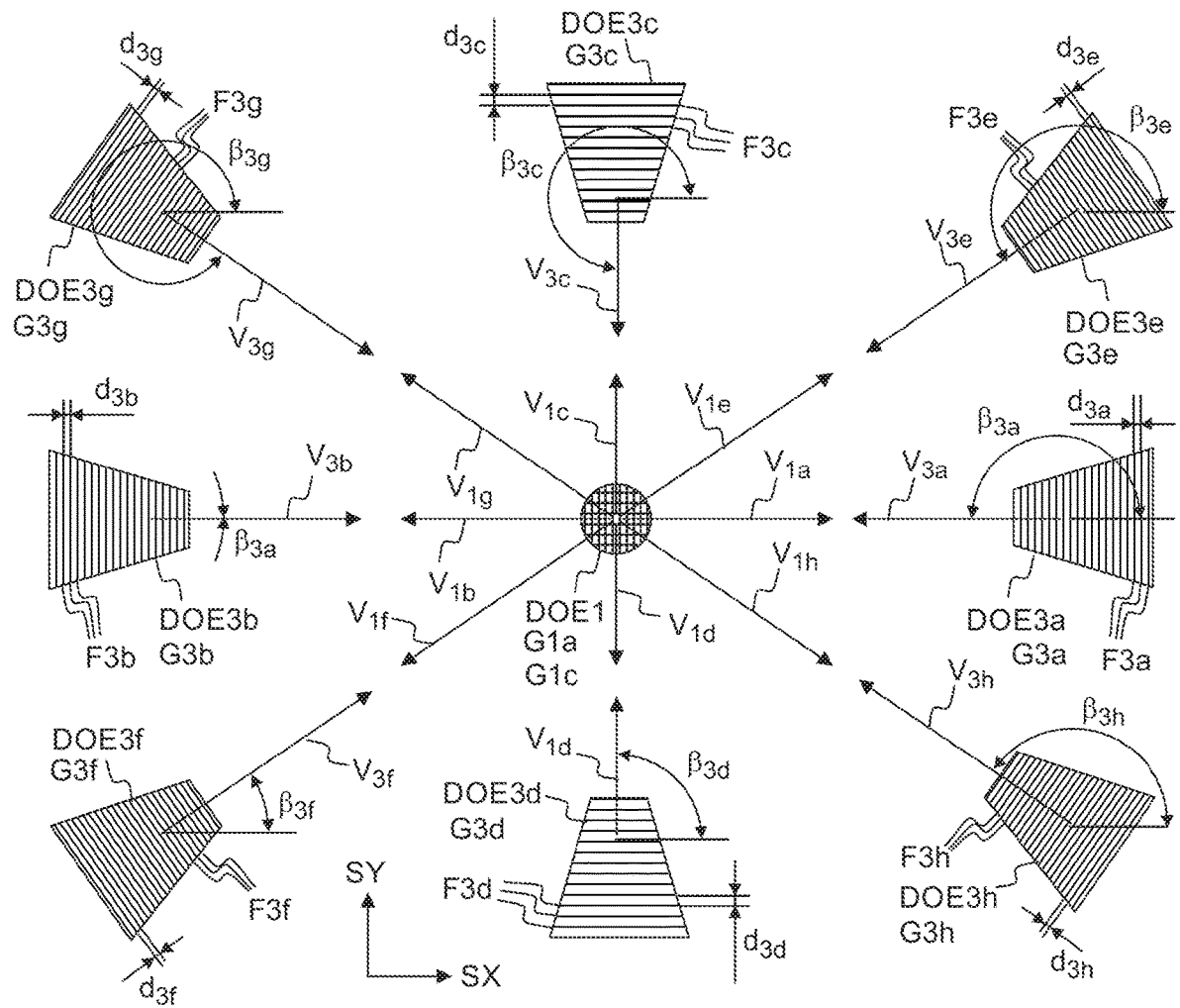
FIG. 11b shows, by way of example, in an axial view, orientations of the grating vectors of four main out-coupling elements, and orientations of the grating vectors of four intermediate out-coupling elements.

Referring to FIG. 11b, the positions and the orientation of the diffractive features of the out-coupling elements may be selected such that output light beams formed by the different out-coupling elements are parallel with each other, in a situation where said output light beams correspond to the same image point of the displayed image.

A main out-coupling element DOE3a may have diffraction grating G3a, which comprises diffractive features F3$_a$, and which has a grating period $d_{3a}$. The direction of the grating vector $V_{3a}$ of the out-coupling element DOE3a is specified by the orientation angle $\beta_{3a}$.

A main out-coupling element DOE3b may have diffraction grating G3b, which comprises diffractive features F3$_b$, and which has a grating period $d_{3b}$. The direction of the grating vector $V_{3b}$ of the out-coupling element DOE3b is specified by the orientation angle $\beta_{3b}$.

A main out-coupling element DOE3c may have diffraction grating G3c, which comprises diffractive features F3$_c$, and which has a grating period $d_{3c}$. The direction of the grating vector $V_{3c}$ of the out-coupling element DOE3c is specified by the orientation angle $\beta_{3c}$.

A main out-coupling element DOE3d may have diffraction grating G3d, which comprises diffractive features F3$_d$, and which has a grating period $d_{3d}$. The direction of the grating vector $V_{3d}$ of the out-coupling element DOE3d is specified by the orientation angle $\beta_{3d}$.

An intermediate out-coupling element DOE3e may have diffraction grating G3e, which comprises diffractive features F3$_e$, and which has a grating period $d_{3e}$. The direction of the grating vector $V_{3e}$ of the out-coupling element DOE3e is specified by the orientation angle $\beta_{3e}$.

An intermediate out-coupling element DOE3f may have diffraction grating G3f, which comprises diffractive features F3$_f$, and which has a grating period $d_{3f}$. The direction of the grating vector $V_{3f}$ of the out-coupling element DOE3f is specified by the orientation angle $\beta_{3f}$.

An intermediate out-coupling element DOE3g may have diffraction grating G3g, which comprises diffractive features F3$_g$, and which has a grating period $d_{3g}$. The direction of the grating vector $V_{3g}$ of the out-coupling element DOE3g is specified by the orientation angle $\beta_{3g}$.

An intermediate out-coupling element DOE3h may have diffraction grating G3h, which comprises diffractive features F3$_h$, and which has a grating period $d_{3h}$. The direction of the grating vector $V_{3h}$ of the out-coupling element DOE3h is specified by the orientation angle $\beta_{3h}$.

The in-coupling element DOE1 may have four grating vectors, which fulfill the following conditions:

$$V_{1a}+V_{1b}=0 \tag{1a}$$

$$V_{1c}+V_{1d}=0 \tag{1b}$$

The magnitude of the grating vector $V_{1b}$ is equal to the magnitude of the grating vector $V_{1a}$, wherein direction of the grating vector $V_{1b}$ is opposite to the direction of the grating vector $V_{1a}$. The magnitude of the grating vector $V_{1c}$ is equal to the magnitude of the grating vector $V_{1d}$, wherein direction of the grating vector $V_{1d}$ is opposite to the direction of the grating vector $V_{1c}$.

The angle $\alpha_{1ac}$ between the grating vector $V_{1a}$ and the grating vector $V_{1c}$ may be e.g. in the range of 600 to 120°. In particular, the angle $\alpha_{1ac}$ may be equal to 90°. Consequently, each out-coupling element may selectively diffract guided light so as to provide optimum image quality. In other words, formation of ghost images may be reduced or avoided.

The in-coupling element DOE1 may comprise a first grating region G1a to provide the grating vectors $V_{1a}$ and $V_{1b}$, and the in-coupling element DOE1 may comprise a second grating region G1a to provide the grating vectors $V_{1c}$ and $V_{1d}$. Alternatively or in addition, the in-coupling element DOE1 may comprise a crossed grating to provide the four grating vectors $V_{1a}$, $V_{1b}$, $V_{1c}$, $V_{1d}$. A crossed grating may comprise e.g. a two-dimensional array of microscopic diffractive protrusions or depressions.

The expander device may comprise four main out-coupling elements to diffract the guided light out of the waveguide plate. The expander device may comprise four main out-coupling elements so that the grating vector of each main out-coupling element may be anti-parallel with a grating vector of the in-coupling element.

The grating periods (d) and the directions ($\beta$) of the grating vectors of the main out-coupling elements (DOE3a, DOE3b, DOE3c, DOE3d) may be selected such that the following conditions are fulfilled. Consequently, output beams provided by the different out-coupling elements may be parallel with each other, said output beams corresponding to an image point of the displayed image.

$$V_{1a}+V_{3a}=0 \tag{2a}$$

$$V_{1b}+V_{3b}=0 \tag{2b}$$

$$V_{1c}+V_{3c}=0 \tag{2c}$$

$$V_{1d}+V_{3d}=0 \tag{2d}$$

The positions of diffractive features F3a of the first main out-coupling element DOE3a may be selected such that the sum of the first input grating vector $v_{1a}$ and the first output grating vector $V_{3a}$ is equal to zero.

The positions of diffractive features F3c of the second main out-coupling element DOE3c may be selected such that the sum of the second input grating vector $v_{1c}$ and the second output grating vector $V_{3c}$ is equal to zero.

The sum of the input grating vector $V_{1b}$ and output grating vector $V_{3b}$ may be equal to zero. The sum of the input grating vector $V_{1d}$ and output grating vector $V_{3d}$ may be equal to zero.

The expander device may further comprise one, two, three, or four intermediate out-coupling elements to diffract the guided light out of the waveguide plate. The expander device may comprise four intermediate out-coupling elements so that the grating vector of each intermediate out-coupling element may be anti-parallel with a vector sum of two grating vectors of the in-coupling element.

The grating periods (d) and the directions (β) of the grating vectors of the main out-coupling elements (DOE3e, DOE3e, DOE3f, DOE3g) may be selected such that the following conditions are fulfilled. Consequently, output beams provided by the different out-coupling elements may be parallel with each other, said output beams corresponding to an image point of the displayed image.

$$V_{1a}+V_{1c}+V_{3e}=0 \quad (3a)$$

$$V_{1b}+V_{1d}+V_{3f}=0 \quad (3b)$$

$$V_{1b}+V_{1c}+V_{3g}=0 \quad (3c)$$

$$V_{1a}+V_{1d}+V_{3h}=0 \quad (3d)$$

Equations (1a) to (3d) specify conditions for the vector sum of the grating vectors. Each term on the left-hand side of equations (1a) to (3d) is vector, which has a magnitude and a direction.

In particular, positions of diffractive features F3e of the first intermediate output element DOE3e may be selected such that the sum of the first input grating vector $V_{1a}$, the second input grating vector $V_{1c}$, and the first intermediate output grating vector $V_{1e}$ is equal to zero.

Referring to FIG. 12a, the in-coupling element DOE1 may comprise a first grating region G1a, which has a grating period $d_{1a}$ and a grating vector $V_{1a}$. The in-coupling element DOE1 may comprise a second grating region G1c, which has a grating period $d_{1c}$ and a grating vector $V_{1c}$. The grating region G1a has diffractive features F1a. The grating region G1c has diffractive features F1c. The diffractive features F1a, F1c may be e.g. microscopic ridges or grooves. The first grating region G1a may be implemented e.g. on a first major surface SRF1 of the waveguide plate SUB1, and the second grating region G1c may be implemented e.g. on a second major surface SRF2 of the waveguide plate SUB1. The first grating region G1a may partly or completely overlap the second grating region G1c, when viewed in the axial direction (AX1, SZ) of the waveguide plate SUB1.

Referring to FIG. 12b, the in-coupling element DOE1 may comprise a crossed grating G1, which has the first grating vector $V_{1a}$ and the second grating vector $V_{1c}$. The crossed grating G1 may have a first grating period $d_{1a}$ and a second grating period $d_{1c}$. The crossed grating G1 may have a two-dimensional array of diffractive features F1. The diffractive features F1 may be e.g. microscopic protrusions or depressions.

Figure 12C:
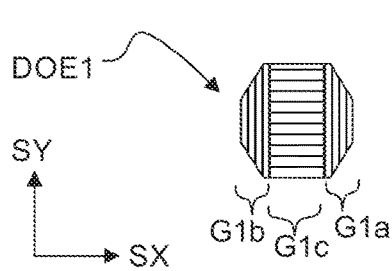
FIG. 12c shows, by way of example, in an axial view, an in-coupling element, which comprises several grating regions.
Figure 12D:
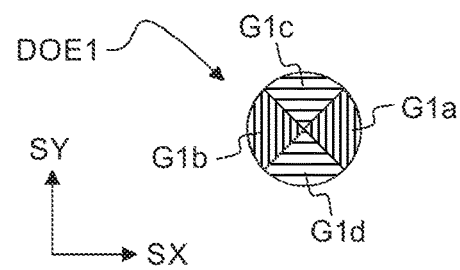
FIG. 12d shows, by way of example, in an axial view, an in-coupling element, which comprises several grating regions.

Referring to FIGS. 12c and 12d, the in-coupling element DOE1 may comprise two or more spatially separate grating regions G1a, G1b, G1c, G1d such that the in-coupling element DOE1 may have the grating vectors $V_{1a}$, $V_{1c}$.

Each formed guided light may be coupled out by only one out-coupling element. Diffraction by a wrong out-coupling element may cause forming of a visually disturbing ghost image. The positions of the diffractive features of the elements may be selected such that the expander device does not form ghost images. The positions of the diffractive features of the elements may be selected such that forming of ghost images is reduced or avoided.

The positions of the diffractive features of the elements may be selected such that the directions of any pair of grating vectors are either equal or sufficiently different from each other, so as to reduce or avoid forming ghost images.

The positions of the diffractive features of the elements may be selected such that the magnitudes of parallel grating vectors are equal, so as to reduce or avoid forming ghost images.

If the directions of grating vectors of two adjacent out-coupling elements (e.g. DOE1a and DOE1e) are different, then the minimum angular separation between the directions of the grating vectors the adjacent out-coupling elements may be e.g. greater than 30°, so as to reduce or avoid forming ghost images.

In general, the optical engine ENG1 may also be provided separate from the display apparatus 500. The optical engine ENG1 may be a replaceable part of the display apparatus 500. The display apparatus 500 may also be delivered without an optical engine ENG1. The display apparatus 500 may comprise an expander device EPE1 and a rotating mechanism also without the optical engine ENG1. The optical engine ENG1 may be mounted to the display apparatus 500 e.g. at a service site or by the user USER1. In an embodiment, a first optical engine ENG1 may be replaced with a second optical engine. A vehicle-mounted display apparatus 500 may also be delivered without an optical engine ENG1. The optical engine ENG1 may be mounted to the display apparatus 500 e.g. at a service site or by the user USER1.

In an embodiment, the waveguide plate SUB1 of the expander device EPE1 may be transparent so that external light EX1 may propagate through the waveguide plate SUB1 in the axial direction (AX1, SZ). For example, a user USER1 may observe an external object OBJ1 through the waveguide plate SUB1 simultaneously when viewing the displayed virtual image VIMG1. The external light EX1 may be propagate from an external object OBJ1 through the waveguide plate SUB1 to the eye EYE1 of the user USER1.

In an embodiment, the waveguide plate SUB1 may comprise cut-outs or openings so that external light EX1 may propagate via the cut-outs or openings in the axial direction (AX1, SZ). The external light EX1 may be propagate from an external object OBJ1 via the cut-outs or openings to the eye EYE1 of the user USER1.

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

What is claimed is:

1. A display apparatus (500) for displaying a virtual image (VIMG1), the display apparatus (500) comprising an expander device (EPE1) to form light beams ($B3_{P0,R}$, $B3_{P1,R}$) of output light (OUT1) by expanding light beams ($B0_{P0,R}$, $B0_{P1,R}$) of input light (IN1), the expander device (EPE1) comprising:
   a waveguide plate (SUB1),
   an in-coupling element (DOE1) to form first guided light (B1a) and second guided light (B1c) by coupling input light (IN1) into the waveguide plate (SUB1), a first main out-coupling element (DOE3a) to form output light (OUT1) by coupling the first guided light (B1a) out of the waveguide plate (SUB1), and a second main out-coupling element (DOE3c) to form output light (OUT1) by coupling the second guided light (B1c) out of the waveguide plate (SUB1), wherein the in-coupling element (DOE1) has a first input grating vector ($V_{1a}$) and a second input grating vector ($V_{1c}$), wherein the first main out-coupling element (DOE3a) has a first output grating vector ($V_{3a}$), wherein the second main out-coupling element (DOE3c) has a second output grating vector ($V_{3c}$), wherein the sum of the first input grating vector ($V_{1a}$) and the first output grating vector ($V_{3a}$) is equal to zero, wherein the sum of the second input grating vector ($V_{1c}$) and the second output grating vector ($V_{3c}$) is equal to zero, wherein positions of diffractive features (F1,F1a,F1c) of the in-coupling element (DOE1) are selected such that an angle ($\alpha_{1ac}$) between the first input grating vector ($V_{1a}$) and the second input grating vector ($V_{1c}$) is in the range of 60° to 120°, and wherein the display apparatus (500) comprises a base (BASE1) and an actuating mechanism (MOTOR1) to cause rotary motion of the waveguide plate (SUB1) with respect to the base (BASE1).

2. The display apparatus (500) of claim 1, wherein the magnitude of the first input grating vector ($V_{1a}$) is different from the magnitude of the second input grating vector ($V_{1c}$).

3. The display apparatus (500) of claim 1, wherein the expander device (EPE1) comprises a third main out-coupling element (DOE3b) to couple guided light (B1b) out of the waveguide plate (SUB1), wherein the in-coupling element (DOE1) is located between the first main out-coupling element (DOE3a) and the third main out-coupling element (DOE3b), wherein the third main out-coupling element (DOE3b) has a third output grating vector ($V_{3b}$), wherein the sum of the third input grating vector ($V_{1b}$) and the third output grating vector ($V_{3b}$) is equal to zero.

4. The display apparatus (500) of claim 3, wherein the expander device (EPE1) comprises a fourth main out-coupling element (DOE3d) to couple guided light (B1d) out of the waveguide plate (SUB1), wherein the in-coupling element (DOE1) is located between the second main out-coupling element (DOE3c) and the fourth main out-coupling element (DOE3d), wherein the fourth main out-coupling element (DOE3d) has a fourth output grating vector ($V_{3d}$), wherein the sum of the fourth input grating vector ($V_{1d}$) and the fourth output grating vector ($V_{3d}$) is equal to zero.

5. The display apparatus (500) of claim 1, wherein the in-coupling element (DOE1) is arranged to form first intermediate guided light (B1e) by coupling input light (IN1) into the waveguide plate (SUB1), wherein the expander device (EPE1) comprises a first intermediate output element (DOE3e) to couple the first intermediate guided light (B1e) out of the waveguide plate (SUB1), wherein the first intermediate output element (DOE3e) is located between the first out-coupling element (DOE3a) and the second out-coupling element (DOE3c), wherein the first intermediate output element (DOE3e) has a first intermediate output grating vector ($V_{1e}$), wherein positions of diffractive features (F3e) of the first intermediate output element (DOE3e) are selected such that the sum of the first input grating vector ($V_{1a}$), the second input grating vector ($V_{1c}$), and the first intermediate output grating vector ($V_{1e}$) is equal to zero.

6. The display apparatus (500) of claim 1, wherein the actuating mechanism (MOTOR1) is arranged to rotate the waveguide plate (SUB1) about an axis (AX1) of rotation, wherein a distance ($e_1$) between the in-coupling element (DOE1) and the axis (AX1) of rotation is smaller than 5% of the width ($w_{EPE1}$) of the waveguide plate (SUB1).

7. The display apparatus (500) of claim 1, comprising an optical engine (ENG1) to form an input image (IMG0) and to convert the input image (IMG0) into a plurality of input light beams ($B0_{P0,R}, B0_{P1,R}$) of the input light (IN1), wherein the expander device (EPE1) is arranged to form light beams ($B3_{P0,R}, B3_{P1,R}$) of output light (OUT1) by expanding the input light beams ($B0_{P0,R}, B0_{P1,R}$) of the input light (IN1).

8. The display apparatus (500) of claim 1, wherein the in-coupling element (DOE1) comprises a crossed diffraction grating (G1).

9. The display apparatus (500) of claim 1, wherein the in-coupling element (DOE1) comprises two or more grating regions (G1a, G1c) having different diffractive properties.

10. A vehicle (1000), comprising the display apparatus (500) according to claim 1.

11. A method for displaying a virtual image (VIMG1), the method comprising:

providing a plurality of input light beams ($B0_{P0,R}, B0_{P1,R}$) of input light (IN1) such that the input light beams ($B0_{P0,R}, B0_{P1,R}$) correspond to image points (P0, P1) of an input image (IMG0), forming output light beams ($B3_{P0,R}, B3_{P1,R}$) of output light (OUT1) by using an expander device (EPE1) to expand the input light beams ($B0_{P0,R}, B0_{P1,R}$) of the input light (IN1), and causing a rotary motion of the expander device (EPE1), the expander device (EPE1) comprising:

a waveguide plate (SUB1), an in-coupling element (DOE1) to form first guided light (B1a) and second guided light (B1c) by coupling input light (IN1) into the waveguide plate (SUB1), a first main out-coupling element (DOE3a) to form output light (OUT1) by coupling the first guided light (B1a) out of the waveguide plate (SUB1), and a second main out-coupling element (DOE3c) to form output light (OUT1) by coupling the second guided light (B1c) out of the waveguide plate (SUB1), wherein the in-coupling element (DOE1) has a first input grating vector ($V_{1a}$) and a second input grating vector ($V_{1c}$), wherein the first main out-coupling element (DOE3a) has a first output grating vector ($V_{3a}$), wherein the second main out-coupling element (DOE3c) has a second output grating vector ($V_{3c}$), wherein the sum of the first input grating vector ($V_{1a}$) and the first output grating vector ($V_{3a}$) is equal to zero, wherein the sum of the second input grating vector ($V_{1c}$) and the second output grating vector ($V_{3c}$) is equal to zero, wherein positions of diffractive features (F1,F1a,F1c) of the in-coupling element (DOE1) are selected such that an angle ($\alpha_{1ac}$) between the first input grating vector ($V_{1a}$) and the second input grating vector ($V_{1c}$) is in the range of 60° to 120°.

12. The method of claim 11, wherein the magnitude of the first input grating vector ($V_{1a}$) is different from the magnitude of the second input grating vector ($V_{1c}$).

* * * * *